United States Patent [19]

Winterbottom

[11] Patent Number: 5,724,512
[45] Date of Patent: Mar. 3, 1998

[54] METHODS AND APPARATUS FOR STORAGE AND RETRIEVAL OF NAME SPACE INFORMATION IN A DISTRIBUTED COMPUTING SYSTEM

[75] Inventor: Philip Steven Winterbottom, Gillette, N.J.

[73] Assignee: Lucent Technologies Inc., Murray Hill, N.J.

[21] Appl. No.: 424,137

[22] Filed: Apr. 17, 1995

[51] Int. Cl.$^6$ .......................... G06F 15/163; G06F 17/30
[52] U.S. Cl. .................. 395/200.12; 395/610; 395/612; 395/616; 395/680; 395/684
[58] Field of Search .......................... 395/200.12, 200.14, 395/610, 612, 616, 617, 680, 684, 200.09, 200.05

[56] References Cited

U.S. PATENT DOCUMENTS

| | | | |
|---|---|---|---|
| 4,718,005 | 1/1988 | Feigenbaum et al. | 395/200.01 |
| 4,887,204 | 12/1989 | Johnson et al. | 395/600 |
| 5,001,628 | 3/1991 | Johnson et al. | 395/600 |
| 5,307,490 | 4/1994 | Davidson et al. | 395/650 |
| 5,333,317 | 7/1994 | Dann | 395/600 |
| 5,357,630 | 10/1994 | Oprescu et al. | 395/600 |
| 5,377,323 | 12/1994 | Vasudevan | 395/200.16 |
| 5,434,974 | 7/1995 | Loucks et al. | 395/700 |
| 5,454,101 | 9/1995 | Mackay et al. | 395/600 |
| 5,463,774 | 10/1995 | Jenness | 395/600 |
| 5,465,365 | 11/1995 | Winterbottom | 395/600 |
| 5,483,652 | 1/1996 | Sudama et al. | 395/600 |
| 5,561,799 | 10/1996 | Khalidi et al. | 395/600 |

FOREIGN PATENT DOCUMENTS

| | | | |
|---|---|---|---|
| 0466482 | 1/1992 | European Pat. Off. | G06F 9/44 |
| 0466486-A3 | 1/1992 | European Pat. Off. | G06F 9/44 |

OTHER PUBLICATIONS

Proceedings of IEEE Workshop on Services for Distributed and Networked Environments, Jun. 27-28, 1994, Los Alamitos, CA, pp. 164-171.

Computer, vol. 21, No. 2, Feb. 1, 1998, pp. 23-36.

Computing Systems, Spring 1994, USA, vol. 7, No. 2, pp. 175-179.

A.K. Yeo, et al., "A Taxonomy of Issues in Name Systems Design and Implementation", 8283 Operating Systems Review (SIGOPS), Jul. 27, 1993, No. 3, pp. 4–18.

Sanjay Radia et al., "The Per-Process View of Naming and Remote Execution," 1993 Annual Hawaii Int'l Conference on System Sciences, pp. 377-386.

Rob Pike et al., "The Use of Name Spaces in Plan 9," Proceedings of the 5th ACM SIGOPS Workshop, 1992, pp. 1-5.

Needham, R.M., "Names," *Distributed Systems*, ACM Press New York, New York, 1993 (reprinted 1994), pp. 315-327.

(List continued on next page.)

*Primary Examiner*—Paul V. Kulik

[57] ABSTRACT

A distributed computing environment is disclosed which allows a user at one location to access resources at other locations. Each resource in the distributed computing environment is represented as a hierarchical file system. A user or process has a name space comprised of at least one hierarchical file system provided by a connected resource. The distributed computing environment allows a first processor to invoke execution of a processing task by a remote processor. The first processor transmits a representation of its current name space to the remote processor. The remote processor will execute the processing task on a name space modified in accordance with the name space representation received from the first processor. The transmitted representation of the name space associated with the first processor includes at least one dynamic name space modification command, such as those executed by a user after logging into the distributed computing system. A plurality of data structures are provided for storing path information which allows the pathname of a given channel, which represents a file, to be determined. The stored path information allows the hierarchical file tree of a connected file system to be generated.

16 Claims, 21 Drawing Sheets

OTHER PUBLICATIONS

Presotto, D., and Winterbottom, P., "The Organization of Networks in Plan 9," Proc. of the Winter 1993 USENIX Technical Conference, San Diego, CA, 1993, pp. 43–50.

Presotto, D., et al., "Plan 9, A Distributed System," Proc. of the Spring 1991 EurOpen conference, Tromso, Norway, 1991, pp. 43–50.

"Plan 9 from Bell Labs, Programmers Manual", 1st Edition, Jan. 20, 1993, pp. 1–542.

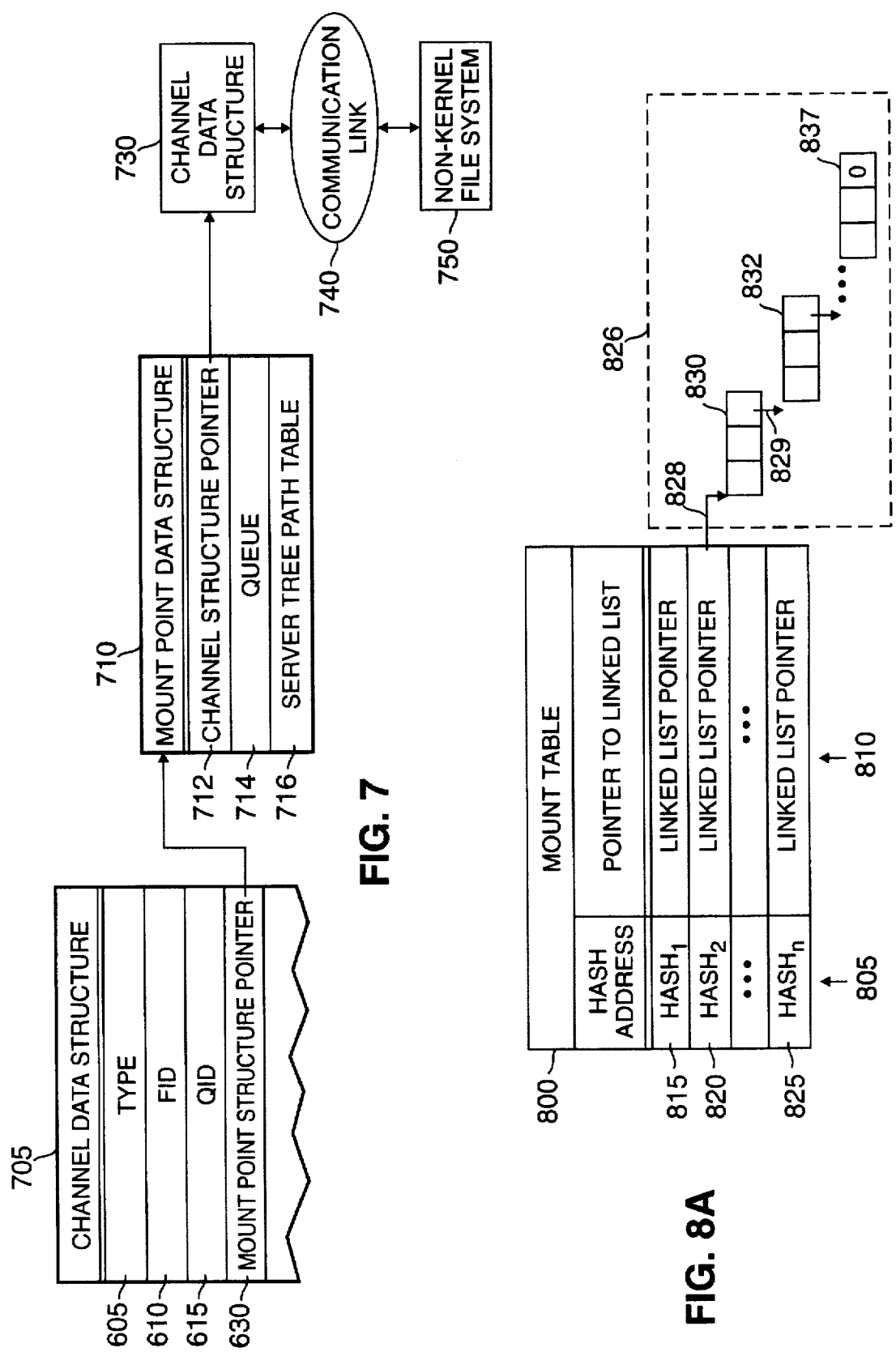

FIG. 9A
900 NETWORK DATABASE
| MACHINE NAME | NETWORK ADDRESS |
|---|---|
| 905 → HELIX | ip = 135.104.9.31<br>dk = nj/astro/helix<br>ether = 0800690222f0 |
| 910 → ⋮ | ⋮ |
| 915 → BOOTES | il = 135.104.9.30!17008 |
↑ 925      ↑ 930
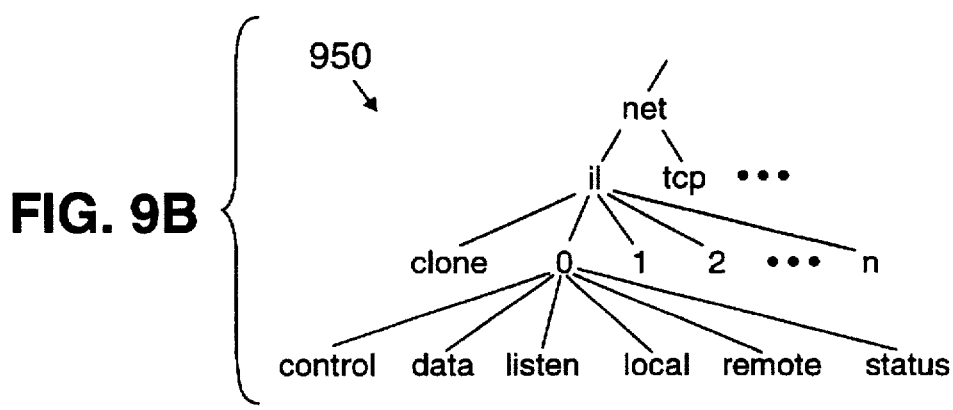
FIG. 9B — 950
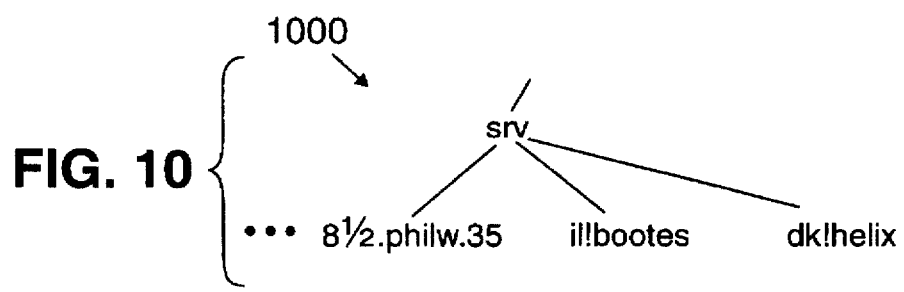
FIG. 10 — 1000

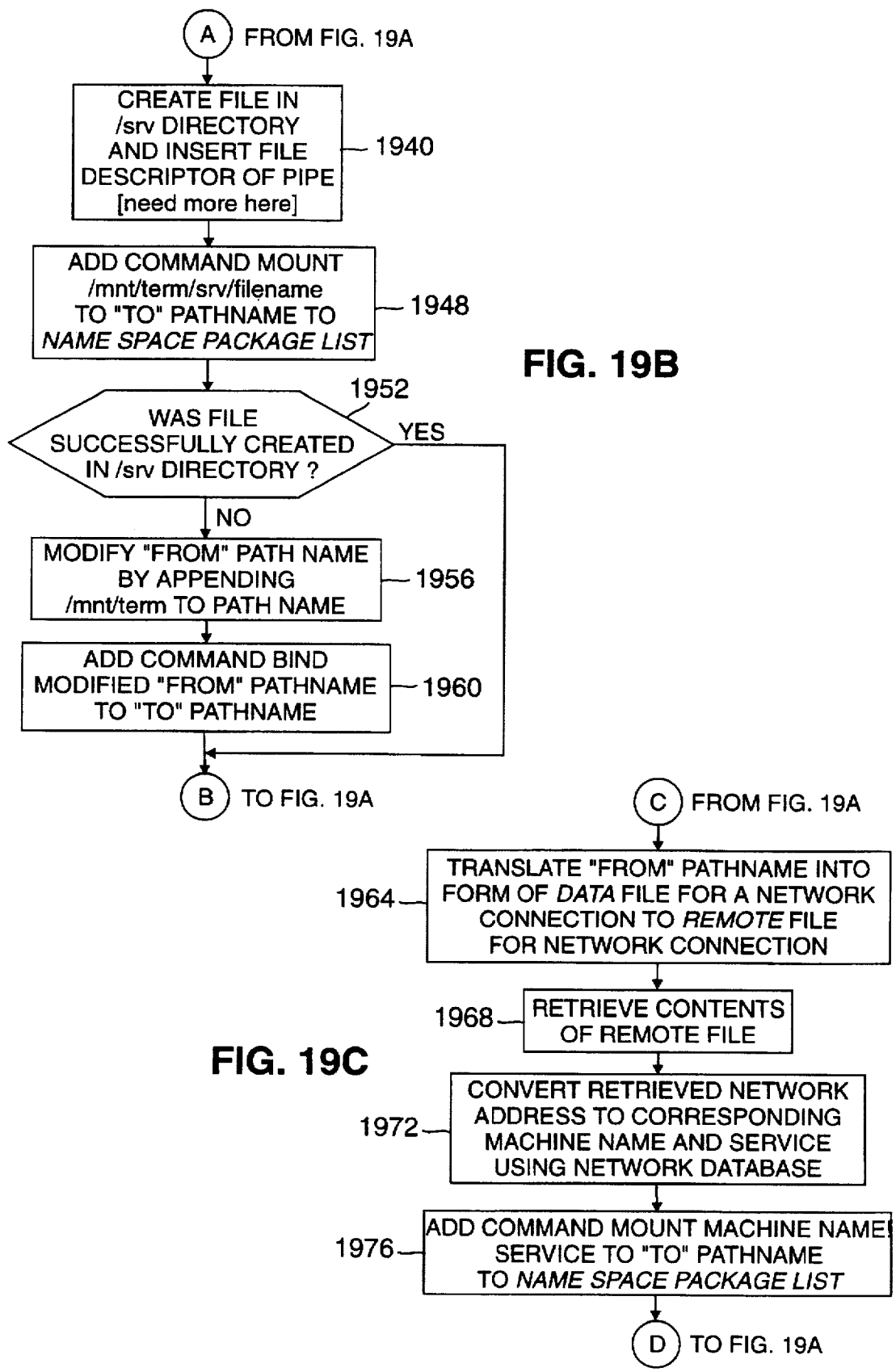

METHODS AND APPARATUS FOR STORAGE AND RETRIEVAL OF NAME SPACE INFORMATION IN A DISTRIBUTED COMPUTING SYSTEM

FIELD OF THE INVENTION

The present invention relates to a distributed computing system, and more particularly, to methods and apparatus for storage and retrieval of name space information in a distributed computing system.

BACKGROUND OF THE INVENTION

The resources and computation tasks in a computing system are increasingly being spread among a plurality of network nodes to form distributed computing systems. The increased popularity of distributed computing systems is due in large part to the increased cost efficiency and availability that they provide. When centralized resources are shared by a plurality of users in a distributed system, their costs are distributed over a larger user base. In addition, the centralization of shared resources makes the administration and maintenance of these resources more efficient and also potentially more reliable due to the possibility of a centralized backup mechanism. Furthermore, the redundancy provided by most distributed computing environments improves the ability to recover from a failure by allowing processing to continue on an alternate device upon a detected failure.

A distributed system offers improvements in processing times as well. For example, a particular processing task can be partitioned in a distributed system into a number of smaller tasks to be executed concurrently on a plurality of distributed processors. In addition, the processing time of a single processing task can often be improved by exporting the task to a more powerful centralized processor.

For a distributed computing system to succeed, however, a user must be able to access the diverse and distributed resources in a uniform manner. Thus, the physical location of any given resource and the peculiar details of its protocols must be transparent to a user. In a number of distributed computing environments, such as the Plan 9 distributed processing system, developed by AT&T Bell Laboratories, every resource in the system is implemented as a hierarchical "file" system, comprised of a tree of the file-like objects that are provided by the resource. Thus, the diverse resources in the distributed system can be accessed in a uniform, file-oriented manner, even if the resource being accessed is not a file in the traditional sense.

Typically, the operating system in such a distributed computing environment allows each "file" to have an alphanumeric name associated with it, which may be utilized to access the file in the name space. In addition, the relationship between files may be specified, thereby allowing files to be organized into the hierarchical tree of directories and files. A file is typically identified in the name space by a pathname through the hierarchical structure to the given file. For a general discussion of name spaces in distributed computing environments, see Roger M. Needham, *Names*, in Distributed Systems 315-27 (Sape Mullender ed., 2d ed. 1993).

The representation of each resource in a distributed system as a set of files provides the desired transparency and allows each user or process to assemble a private view of the set of available resources. Thus, each user or process can have a customized name space comprised of the file trees provided by one or more selected resources. Thereafter, when a user or process implements an operation on a file, identified by the pathname through the customized hierarchical file tree, the pathname is resolved to the particular file-like object that should be operated upon.

While the local operating system kernel can keep track of the relationship between names and physical objects in the customized name space of a local user or process, name space resolution problems are invited when the user or process exports a processing task to another, perhaps more powerful, remote processor in the distributed system. If the remote processor does not perform the particular processing task on the exact same name space assembled by the exporting user or process, then a pathname may not be correctly translated into the appropriate file-like object to be operated upon.

As is apparent from the above discussion, a need exists for a distributed computing environment which allows a first processor to invoke execution of a processing task by a remote processor, where the remote processor will execute the processing task on a name space modified in accordance with a name space representation received from the first processor. A further need exists for an apparatus for storing name space information in a node of the distributed computing system, where the stored name space information includes an indication of the hierarchical file systems provided by resources which have been joined to an indicated portion of the name space, as well as path information which allows the file system hierarchy of each connected resource to be recreated. A further need exists for a method for identifying a pathname associated with a given channel, which represents a file, in the distributed computing system.

SUMMARY OF THE INVENTION

Generally, according to one aspect of the invention, a computing environment distributed across a plurality of computers and networks is provided which allows a user at one location to access resources at other locations. The distributed computing environment allows a first processor to invoke execution of a processing task by a remote processor, such as a central processing unit. According to features of the present invention, the first processor will transmit a representation of its current name space to the remote processor. The remote processor will execute the processing task on a name space modified in accordance with the name space representation received from the first processor.

One feature of the present invention provides a method performed by the first processor in the distributed computing system for invoking execution of a processing task on the remote processor, where the first processor has an associated first name space formed by a plurality of name space modification commands. The method comprises the steps of: establishing a communication link between the first processor and the remote processor; identifying the plurality of name space modification commands that form the first name space, where the plurality of identified name space modification commands includes at least one dynamic name space modification command; and transmitting the plurality of name space modification commands to the remote processor for execution of the processing task by the remote processor on a name space modified in accordance with the transmitted plurality of name space modification commands.

A further feature of the invention provides a method performed by the remote processor in the distributed computing system for executing a processing task received from the first processor, where the first processor has a first name space formed by a plurality of name space modification commands, and the remote processor has a second name space. The method comprises the steps of: processing a connection request from the first processor; allocating a process on the remote processor to execute the invoked processing task; receiving from the first processor the plurality of name space modification commands that form the first name space, where the plurality of received name space modification commands includes at least one dynamic name space modification command; establishing a communication link to the first processor; mounting the communication link to the first processor in a predefined place in the second name space; executing the plurality of received name space modification commands to modify the second name space; and executing the invoked processing task on the modified second name space.

A further feature of the invention provides an apparatus for storing name space information in a node of the distributed computing system, where each of the resources is represented as a hierarchical file system, the name space is comprised of at least one resource hierarchical file system joined to the name space by one or more name space modification commands and the name space is modifiable on a per process basis. The apparatus comprises: a mount table for storing an indication of each of the resource hierarchical file systems joined to an indicated portion of the name space by the name space modification commands; and a server tree path table associated with each of the hierarchical file systems joined to the name space. The server tree path table provides path information for each of the files in the associated hierarchical file system, with the path information allowing the file system hierarchy to be recreated. The path information stored for each of the files includes the name of the associated file and an indication of the parent file of the associated file in the name space hierarchy.

A further feature of the invention provides a method for identifying a pathname associated with a given channel in the distributed computing system, where the distributed computing system includes a plurality of distributed resources, each of the resources are represented as a hierarchical file system comprised of one or more files, a collection of one or more hierarchical file systems forms a name space, each of the hierarchical file systems has a root directory, each of the channels represents a given file in the name space, each of the files has a filename comprised of an alphanumeric label, and the pathname identifies the file by specifying a path through the hierarchical file system from the root directory to the given file. The method comprises the steps of: associating a path data structure with each of the channels, where the path data structure stores the filename of the associated file and a pointer to the path data structure associated with a parent file in the name space hierarchy; receiving an indication of the channel for which the pathname is to be identified; identifying the path data structure associated with the indicated channel; retrieving the filename and the pointer to the path data structure associated with the parent file from the identified path data structure; and following the retrieved pointer to the path data structure associated with the parent file and repeating the previous retrieval step until the root directory of the hierarchical file system is reached, where each of the filenames retrieved from the path data structures are appended to the front of the generated pathname associated with the indicated channel.

A more complete understanding of the present invention, as well as further features and advantages of the invention, will be obtained by reference to the detailed description and drawings.

BRIEF DESCRIPTION OF THE DRAWINGS

FIG. 7 illustrates a plurality of related data structures, which together form the mount point of FIG. 4C to a particular non-kernel file system;

FIG. 8A illustrates a mount table and associated data structures, suitable for storing the sequence of bind and mount commands that form the name space of a user or process;

FIG. 9A illustrates a network database, suitable for storing network destination address information for a plurality of machines in the distributed computing environment of FIG. 1;

FIG. 9B illustrates a portion of the name space of a user or process related to networks;

FIG. 10 illustrates a directory in the name space of a user or process, suitable for storing a file for each communication link to the non-kernel file systems shown in FIG. 4C;

FIGS. 19A through 19C, collectively, are a flow chart describing a package name space subroutine which may be utilized by the process execution exporter of FIG. 16A to package the list of bind and mount commands modified by the pathname substitution subroutine of FIG. 18 for transmission to the remote processor.

DETAILED DESCRIPTION

Figure 1:
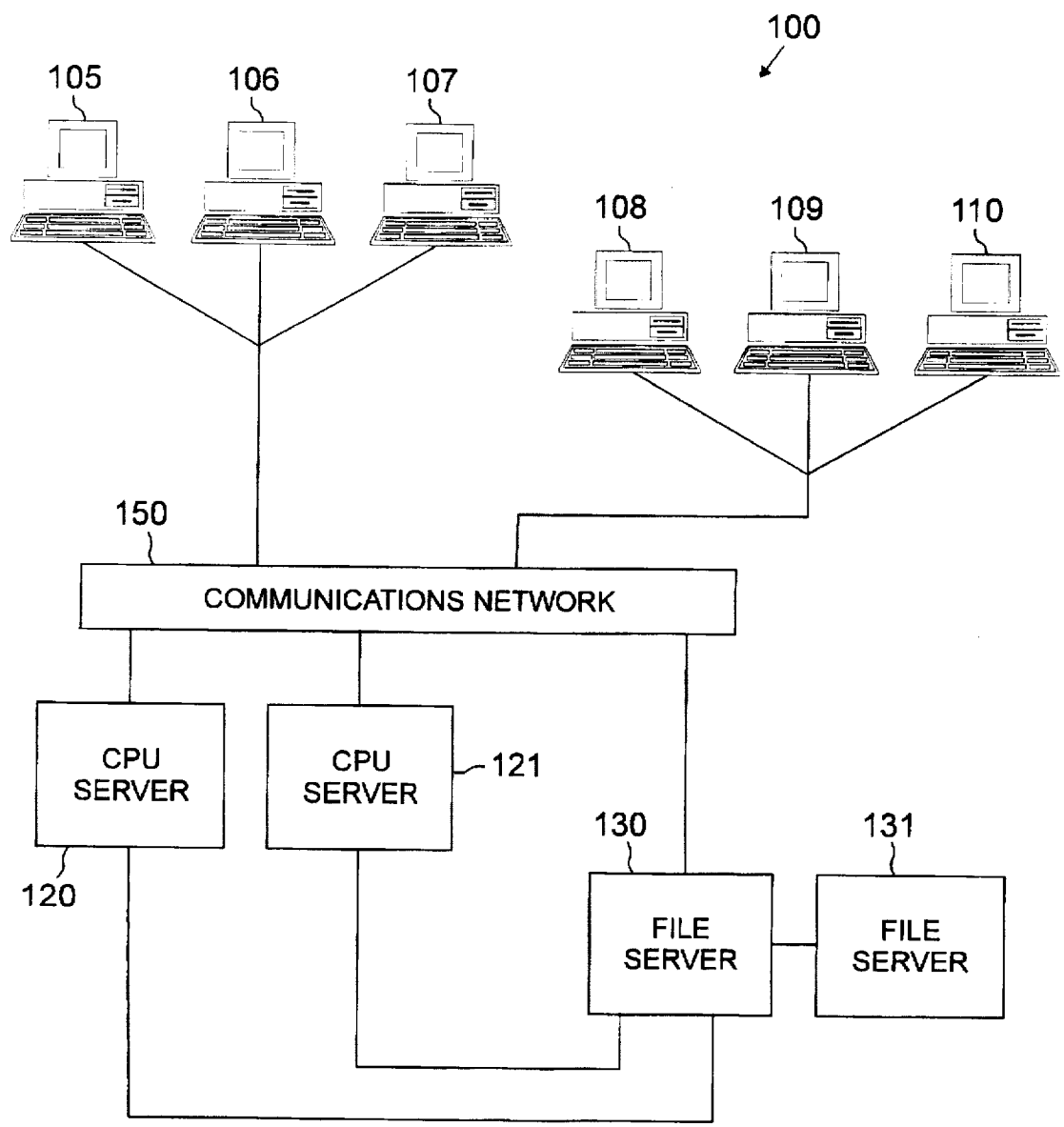
FIG. 1 illustrates a distributed computing environment, suitable for implementing features of the present invention.

FIG. 1 shows an illustrative configuration for a distributed computing environment 100, suitable for implementing features of the present invention. As discussed further below, the distributed computing environment 100 is preferably distributed across a plurality of computers and networks, and allows a user at one location to access resources at other locations, for example, by establishing a communication link between the user's terminal and the desired resource.

The distributed computing environment 100 allows a processing task to be exported to a remote processor. According to one feature of the present invention, when a user or process indicates that a processing task should be exported to a remote process, the current state of the name space associated with the exporting user or process will be evaluated. Thereafter, the current state of the name space, in other words, the sequence of name space modifications commands which have been executed by the user or process to form the name space, are transmitted to the remote processor. In this manner, the remote processor can accurately recreate the name space of the exporting user or process and thereby reliably resolve a file name into the appropriate file or file-like object that should be operated on.

The invention will be described in eight main sections as follows. First, the overall network environment, as well as an illustrative node of the distributed network 100 will initially be described relative to FIGS. 1, 2A and 2B in a section entitled SYSTEM ARCHITECTURE. Second, the name space associated with a user or a process in the distributed computing system is described in a section entitled CONCEPTUAL REPRESENTATION OF RESOURCES IN A NAME SPACE. This section includes a discussion of the manner in which the hierarchical file trees of one or more remote resources may be joined into the desired location of the customized name space of a particular user or process.

Third, a preferred operating system incorporating features of the present invention is discussed in a section entitled OPERATING SYSTEM KERNEL. This section includes a discussion of the interface provided by the operating system kernel to every resource in the distributed computing environment. Fourth, a preferred implementation for representing the individual file-like objects that may be accessed in the name space will be described in a section entitled ACCESSING RESOURCES IN THE DISTRIBUTED SYSTEM. A preferred embodiment of a channel data structure, which preferably represents each file that may be accessed, is discussed in conjunction with FIG. 6. In addition, further data structures that are utilized by the kernel to store file-access information are discussed relative to FIG. 5.

Fifth, the data structures and communication links that are established by the kernel to communicate with a resource that is not provided by the kernel are discussed in a section entitled COMMUNICATING WITH NON-KERNEL FILE SYSTEMS. This section describes the establishment of a communication link, such as a pipe or a network connection, to a desired non-kernel file system; the creation of the appropriate data structures for storing access and path information for the non-kernel file system; and the manner in which the root directory of the file tree of the non-kernel file system is mounted into the name space of the local user or process. In addition, a preferred implementation of a mount table 800 for storing the series of name space modification commands that form the current state of the local name space is discussed in conjunction with FIGS. 8A and 8B.

Sixth, a preferred implementation for creating and managing network connections is discussed in a section entitled NETWORK REPRESENTATION. This section includes a discussion of translating between symbolic machine names and the associated network destination addresses. Seventh, a number of preferred path data structures incorporating features of the present invention are discussed in a section entitled NAME SPACE INFORMATION DATA STRUCTURES. This section describes how the pathname associated with a particular channel can be determined and how the name space of the accessed files in the file tree of each connected non-kernel file system may be recreated.

Finally, processes incorporating features of the present invention are described in a section entitled NAME SPACE PROCESSES. This section includes describes a process execution exporter 1600, discussed in conjunction with FIG. 16A, which may be utilized to export a processing task, together with an accurate representation of the current state of the local name space, to a remote processor. In addition, a process execution importer 1650, discussed in conjunction with FIG. 16B, may be executed by the selected remote processor to import the processing task exported by the local node. The process execution importer 1650 recreates the name space of the local node, and thereby ensures that filenames are accurately resolved into the appropriate files or file-like objects to be operated The distributed computing environment 100 shown in FIG. 1 is preferably embodied as a Plan 9 distributed processing system, developed by AT&T Bell Laboratories, 600 Mountain Avenue, Murray Hill, N.J. 07974-0636, as modified herein to provide mechanisms for storing and retrieving name space information. For a detailed discussion of the Plan 9 distributed processing system, see U.S. patent application Ser. No. 443,650 a continuation of U.S. patent application Ser. No. 08/237,967 now abandoned, filed May 3, 1994, which is a continuation of U.S. patent application Ser. No. 07/702,651, filed May 17, 1991, now abandoned, and U.S. Pat. No. 5,465,365 filed May 20, 1994, which is a continuation of U.S. patent application Ser. No. 07/999,755, filed Dec. 31, 1992, now abandoned, each incorporated herein by reference. Additional discussions of the Plan 9 distributed processing system may be found in David Presotto et al., "Plan 9, A Distributed System," Proc. of the Spring 1991 EurOpen Conference, pp. 43–50 (Tromso, Norway 1991); and "Plan 9 from Bell Labs, Programmers Manual", each of which are incorporated herein by reference and are available by file transfer protocol (ftp) from the internet address plan9.att.com in the directories pub/plan9doc and pub/plan9dist.

System Architecture

Generally, the distributed computing environment 100 includes a plurality of user terminals, such as the terminals 105–110, as well as one or more central processing unit (cpu) servers 120–121, and one or more file servers 130–131. The user terminals 105–110 may be embodied, for example, as a general-purpose computing system 200, discussed further below in conjunction with FIGS. 2A and 2B, such as a minicomputer, a work station, or a personal computer. As discussed further below, the user terminals 105–110 preferably provide each user of the distributed computing environment 100 with a dedicated computer having a bit map screen and a mouse on which to run a window system. The window system provides a multiplexed interface to the resources in the distributed computing environment 100.

The cpu servers 120–121 preferably concentrate computing power into large multiprocessors in a known manner and may be embodied, for example, as a Power Series machine, commercially available from Silicon Graphics. Thus, for computationally intensive tasks, such as compilation, the user can execute a cpu command, discussed further below in conjunction with FIG. 16A, which will transfer the processing of subsequent commands to a cpu server, such as the cpu 120 or 121. Although a prompt from the command interpreter will appear in the active window of the user's terminal 105–110 following execution of the cpu command, the command interpreter will be running on the cpu server 120 or 121.

As discussed below, the present invention allows the processing tasks that are performed by the remote cpu server 120 or 121 to be performed in a name space that is identical to the name space of the user or process executing on the terminal. Name spaces are discussed below in a section entitled CONCEPTUAL REPRESENTATION OF RESOURCES IN A NAME SPACE.

The file servers 130–131 provide repositories for storage of files utilized by the user terminals 105–110, as well as by the cpu servers 120–121, in a known manner. As discussed further below in conjunction with FIGS. 3A and 3B, the file servers 130–131 provide a hierarchical file system, comprised of a tree of files provided by the server 130–131.

The organization and management of networks is an important aspect of any distributed system, such as the distributed computing environment 100 shown in FIG. 1. This is especially true where key components of the distributed computing environment 100, such as the cpu servers 120–121 and the file servers 130–131 are positioned at centralized locations. In a preferred embodiment, the cpu servers 120–121 and the file servers 130–131 are interconnected by high-speed network connections, such as high bandwidth point-to-point fiber links. The user terminals 105–110, however, may be connected to other resources in the distributed computing environment 100 by lower-speed network connections 150, such as Ethernet or Datakit connections. One suitable implementation for creating and managing network connections is discussed further below in conjunction with FIGS. 9A and 9B.

Figure 2A:
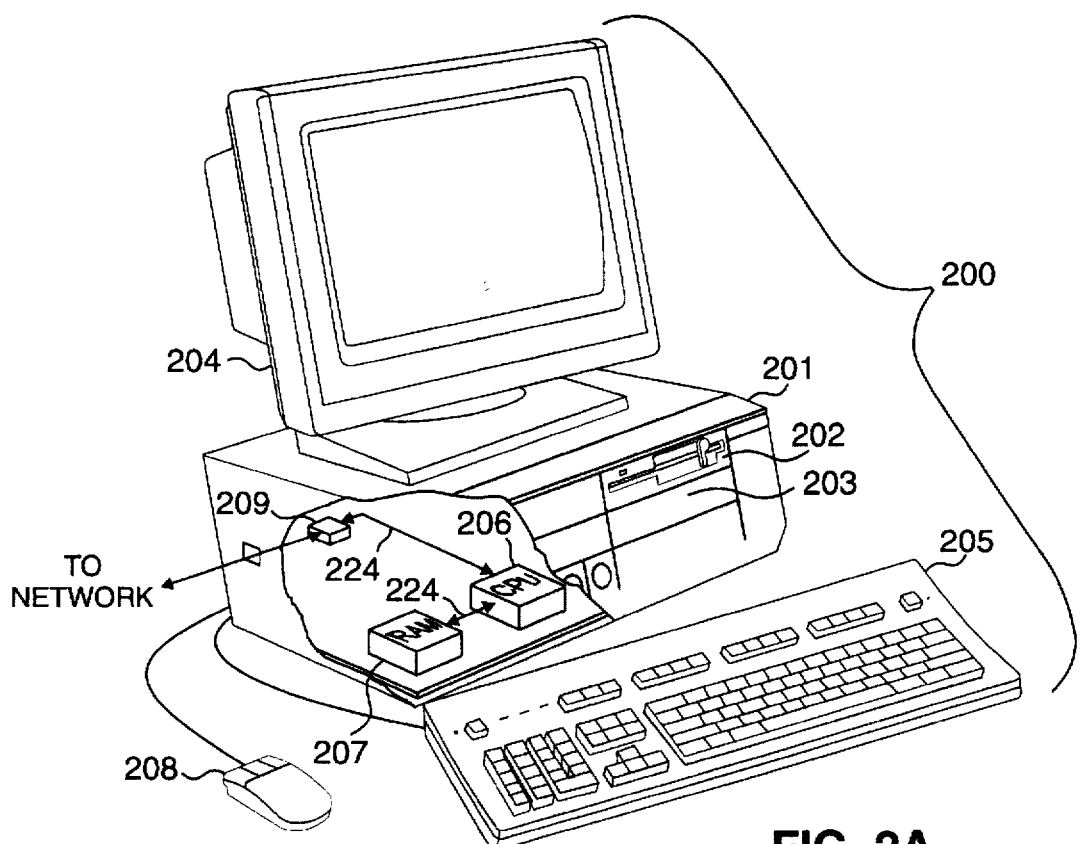
FIG. 2A illustrates an isometric view of a general purpose computing system which may serve as a user terminal in the distributed computing environment of FIG. 1.

One embodiment of a general-purpose computing system 200, suitable for use as a user terminal 105–110 is shown in further detail in FIG. 2A. The general-purpose computing system 200 may be, for example, a minicomputer, a work station, or a personal computer. The general purpose computing system 200 preferably includes a display monitor 204, one or more processing units 206, a memory storage device 207, such as a random access memory, busses 224 and one or more user interfaces, such as a mouse 208 and a keyboard 205. As indicated above, the display monitor 204 preferably supports a window system. The processing unit 206 and memory storage device 207 are discussed further below in conjunction with FIG. 2B.

The computing system 200 may also include an external disk drive 202 and a hard disk drive 203. The external disk drive 202 is operable to receive, read and write to one or more external data storage devices, such as a floppy disk, tape, or compact disk, while the hard disk drive 203 is operable to provide fast access data storage and retrieval functions, in a known manner.

In addition, the computing system 200 preferably includes one or more data communication ports for serial or parallel data communication with remote devices. For example, the processing unit 206 may be further connected to a network interface 209, such as an ATM host adapter card commercially available from Fore Systems, Inc. of Pittsburgh, Pa.

Figure 2B:
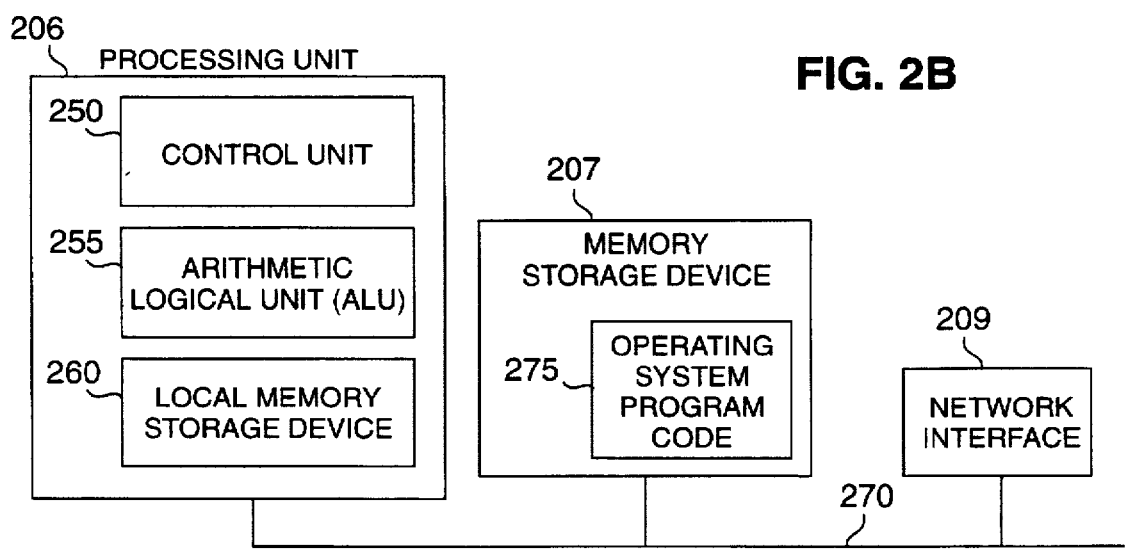
FIG. 2B illustrates a block diagram of a microprocessing system, which may be utilized in conjunction with the general purpose computing system of FIG. 2A.

FIG. 2B illustrates a schematic block diagram of a microprocessing system, which may be utilized in conjunction with the general purpose computing system 200 in FIG. 2A. The microprocessing system includes a processing unit 206, which may be embodied as a single processor or a number of processors operating in parallel, coupled via data bus 270 with the memory storage device, such as the RAM 207, and the network interface 209. The memory storage device 207 is operable to store one or more instructions which the processing unit 206 is operable to retrieve, interpret and execute. In addition, the memory storage device 207 stores the program code associated with the operating system 275, discussed further below in conjunction with FIGS. 4A through 4C.

The processing unit 206 includes a control unit 250, an arithmetic logic unit (ALU) 255, and a local memory storage device 260, such as, for example, a cache or a plurality of registers. The control unit 250 is operable to retrieve instructions from the memory storage device 207. The ALU 255 is operable to perform a plurality of operations needed to carry out instructions. The local memory storage device 260 is operable to provide high speed storage used for storing temporary results and control information.

CONCEPTUAL REPRESENTATION OF RESOURCES IN A NAME SPACE

As previously indicated, the distributed computing environment 100 allows a user to access a plurality of local and remote resources. Preferably, every resource in the system is implemented as a hierarchical "file" system, comprised of a tree of the file-like objects that are provided by the resource. In this manner, a user may access each resource in a uniform, file-oriented manner, even if the resource being accessed is not a file in the traditional sense.

In the discussion which follows, the term "file" includes traditional files, as well as other file-like objects. It is noted that each file in the name space of a user or a process is represented as a channel data structure, discussed below in conjunction with FIGS. 5 and 6.

Thus, hierarchical file systems are utilized to represent traditional file systems, such as those provided by the file servers 130–131, as well as other non-traditional resources, such as physical devices and processes. For example, an RS232 line may be represented as a hierarchical file system comprised of a directory containing a data file and a control file. When data is written to the data file, the data is transmitted on the associated RS232 line. Similarly, data received on the associated RS232 line is obtained by reading the data file. The control file contains a listing of control parameters associated with the RS232 line, which may be modified to change parameters, such as the bit rate, of the physical device.

The operating system 275 allows each file in the file system to have an alphanumeric name or label associated with it, which can later be utilized by a user to locate the file in the name space. In addition, the user can specify the relationship between files, thereby allowing files to be organized into a hierarchical tree of directories and files. It is noted that directories are actually files containing information on the location of other files.

Conceptually, the hierarchical tree of directories and files provides a mechanism for maintaining the relationship between names and entities, and permits a user to locate the object by means of a pathname. A pathname of a file is defined to be an alphanumeric string which identifies a file by specifying a path through the hierarchical structure to the file. In one embodiment, a pathname consists of the "/" character, representing the root directory, together with the names of all of the directories between the root directory and the desired file, each separated by the slash character.

A user or a process will assemble a private view of the set of resources available in the distributed computing environment 100 by selecting one or more desired resources to form a customized name space for the associated user or process. For example, as shown in FIG. 3A, a user operating on a terminal 305 may wish to be connected to one file server 310, for example, where personal files reside, as well as to a second file server 315, such as a departmental file server where the software for a particular group project is being written.

The operating system 275 will typically provide a terminal, such as the terminal 305, with a minimum default name space 320 each time the terminal is booted up. The default name space 320 may include, for example, input and output services, the binary code for executing the processor on the terminal 305 and a process service. For a more detailed discussion of the default or "stub" name space in the illustrative Plan 9 distributed processing system, see, for example, U.S. patent application Ser. No. 443,650, filed May 3, 1994, incorporated above.

Figure 3A:
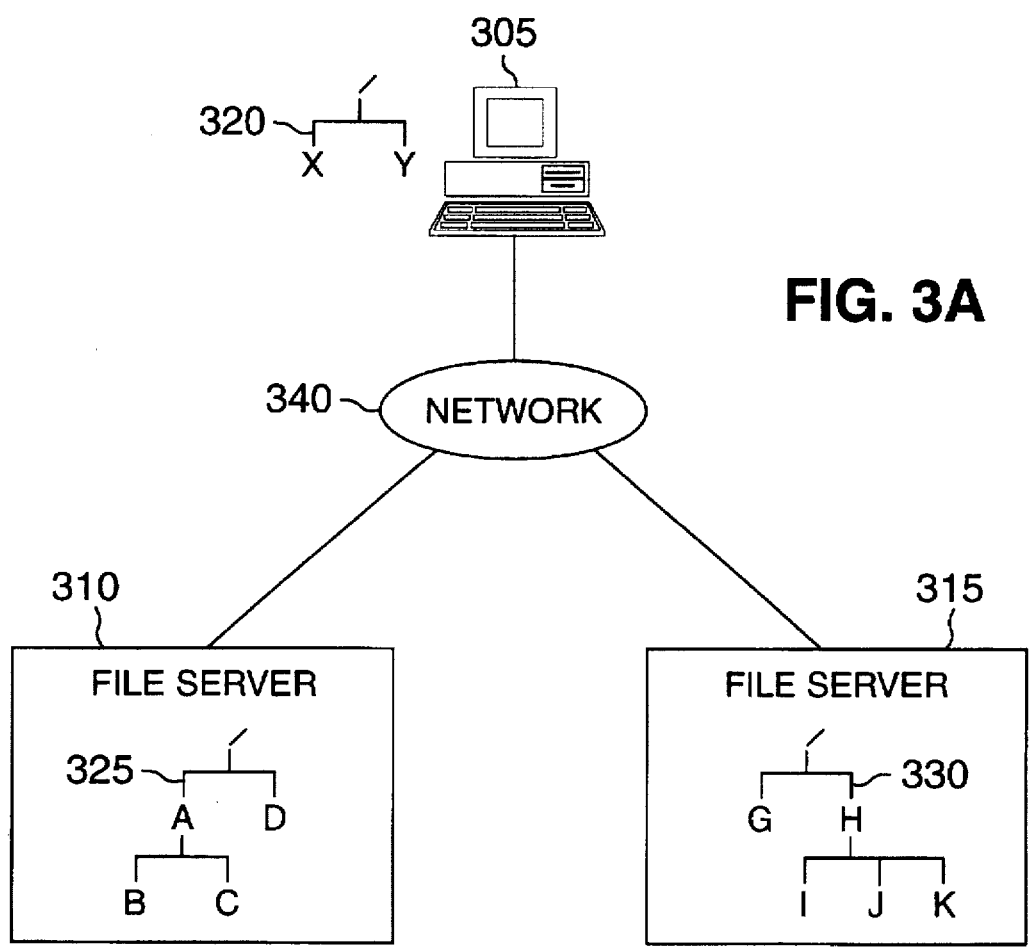
FIG. 3A illustrates the individual name spaces of a user terminal and two file servers.
Figure 3B:
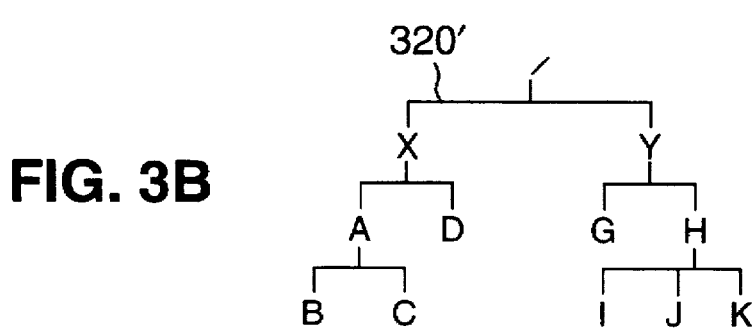
FIG. 3B illustrates the customized name space of the user of FIG. 3A, comprised of the file trees of the two file servers.

For illustrative purposes, however, the default name space 320 of the terminal 305 shown in FIG. 3A includes just a root directory, /, containing two files, X and Y. The files X and Y will serve as mount points, discussed further below in conjunction with FIGS. 4C and 7, where the file systems provided by other resources may be mounted upon. As shown in FIG. 3A, the file server 310 provides a name space 325 and the file server 315 provides a name space 330. The user terminal 305 can modify the default name space 320 to form a modified name space 320', shown in FIG. 3B, by making the file X in the name space 320 equivalent to the root, /, of the name space 325 provided by the server 310, and making the file Y in the name space 320 equivalent to the root, /, of the name space 330 provided by the server 315.

In order to join the name spaces 325 and 330 of each connected service 310 and 315, respectively, to the user's local name space 320', the appropriate connections through the network 340 must be established. The mechanisms for establishing the network connections and for joining the name space of a particular remote service to the desired location of the name space 320 associated with the terminal 305 are described below in conjunction with FIG. 7.

It is noted that in addition to the default name space provided by the operating system 275 to each user, a particular user can typically customize their name space by writing a name space profile. The user-customized profile is a file typically stored in the user's personal directory in the default name space and contains a list of resources or services to which the user should automatically be attached, in addition to the default resources, and indicates where in the user's name space they should be attached. For example, a user's profile may indicate the home file server that will be utilized by the user and indicate that the root of the home file server should be attached to the root of the user's local name space, /. In addition, the user's profile may indicate that the process file system should be attached to a directory, /proc, found in the default name space.

Thus, upon logging in to the distributed computing environment 100, a particular user will be automatically provided with the default name space, as modified by the user's customized profile, hereinafter collectively referred to as the user's predefined name space. The user's predefined name space is formed by executing the series of predefined name space modification commands associated with the default name space and the user's customized name space.

In addition, during operation, the user may execute dynamic name space modification commands, which serve to further modify the user's predefined name space. It is noted that a dynamic name space modification command is defined herein to include any name space modification command executed by a user or process that is not included in the list of predefined name space modification commands associated with the user's predefined name space. Thus, dynamic name space commands would typically include any name space modification command executed by a user or process after logging in to the distributed computing environment 100.

For example, the illustrative Plan 9 distributed processing system provides a pair of name space modification commands, namely, bind and mount. The bind command makes a file or directory in the current local name space, represented as a channel data structure, referred to herein as a "from" file, equivalent to another portion of the current name space, represented as another channel and referred to as the "to" file. In other words, the "to" channel is bound to the "from" channel. Thus, following execution of a bind command, references to the file specified by the "from" pathname will be interpreted as references to the file specified by the "to" pathname.

The mount command makes a name already in the current local name space, represented as a channel, referred to herein as the "from" file, equivalent to the root of a non-kernel file system, such as a remote file server, referred to herein as the "to" file, represented as another channel. In other words, the mount command mounts the channel representing the root directory of a non-kernel file system upon a channel representing an indicated portion of the current name space. It is noted that the root directory provides access to the entire hierarchical file tree provided by the non-kernel file system. Thus, following execution of a mount command, references to the file specified by the "from" pathname, which has been mounted upon, and any files below it in the hierarchy, will be interpreted as references to the files in the file tree of the non-kernel file system and thus become request messages written to the communication stream. In the example of FIG. 3A, the root directory, /, of the remote file server 310, has been mounted upon the file X in the default name space 320 of the terminal 305.

In addition, the bind and mount commands preferably allow different kinds of relationships to be specified among the "from" and "to" files. First, the user or process can preferably specify that whatever is referred to by the "to" file completely replaces whatever is referred to by the "from" pathname. In addition, the user or process can specify that the "from" and "to" pathnames form a union directory comprised of the files in both the "from" and "to" directory files. Essentially, the union directory is a directory with several mounted services. Preferably, the user or process can specify whether the "from" directory is searched before or after the "to" directory iX the resulting union directory.

Thus, the current state of the name space associated with a user or process is determined by the list of predefined name space modification commands associated with the default name space 320, as modified by the user-customized profile, as well as by the dynamic name space modification commands that were executed by the user or process. It is noted that the default name space and user-customized profile, which form the user's predefined name space, are typically stored as files in the name space of the user or process. According to a feature of the present invention, the list of dynamic name space modification commands, such as the subsequently executed mounts and binds, are stored in a mount table 800, discussed below in conjunction with FIGS. 8A and 8B, which contains an entry for each mount and bind. The mount table 800 preferably allows the list of mounts and binds to be retrieved from the table 800 in the order in which they were executed. It is noted, however, that the list of dynamic name space modification commands retrieved from the mount table 800 is in terms of the particular channel data structures that were bound or mounted, and is not in terms of more useful file pathnames.

Figures 11A, 11B, 11C:
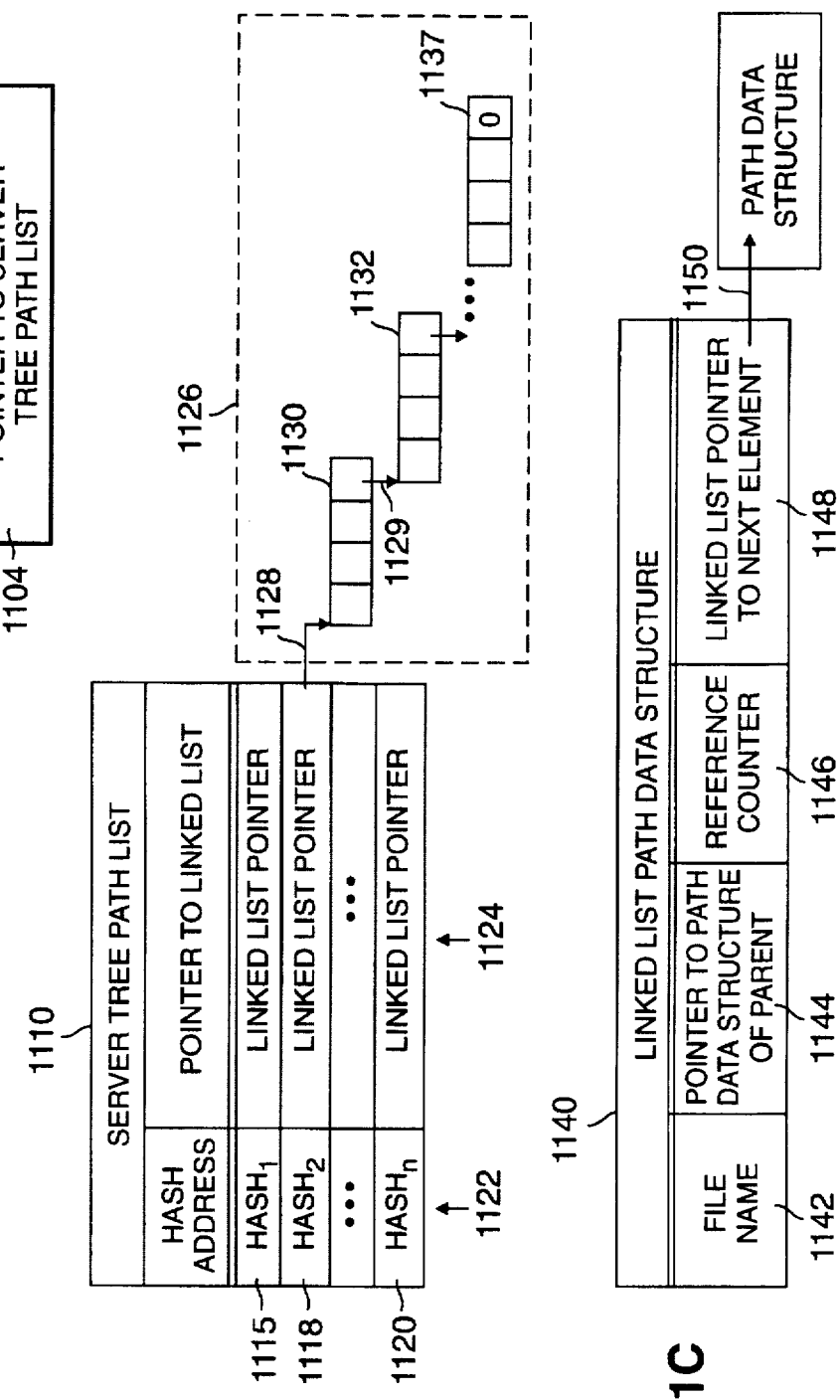
FIG. 11A illustrates a server tree path table, suitable for storing path information for each of the files in the tree of a non-kernel file system shown in FIG. 4C.
FIG. 11B illustrates a server tree path list, suitable for storing pointers to path data structures for each file in the tree of a non-kernel file system shown in FIG. 4C.
FIG. 11C illustrates a path data structure, suitable for storing path information for a particular file.

Thus, according to further features of the invention, discussed below, additional data structures, discussed in conjunction with FIGS. 11A through 11C, are provided that store path information which allows the pathname corresponding to each channel to be determined. In addition, as discussed below, the stored path information allows the name space of the accessed files in the tree of each connected non-kernel file system to be recreated.

Operating System Kernel

Figure 4A:
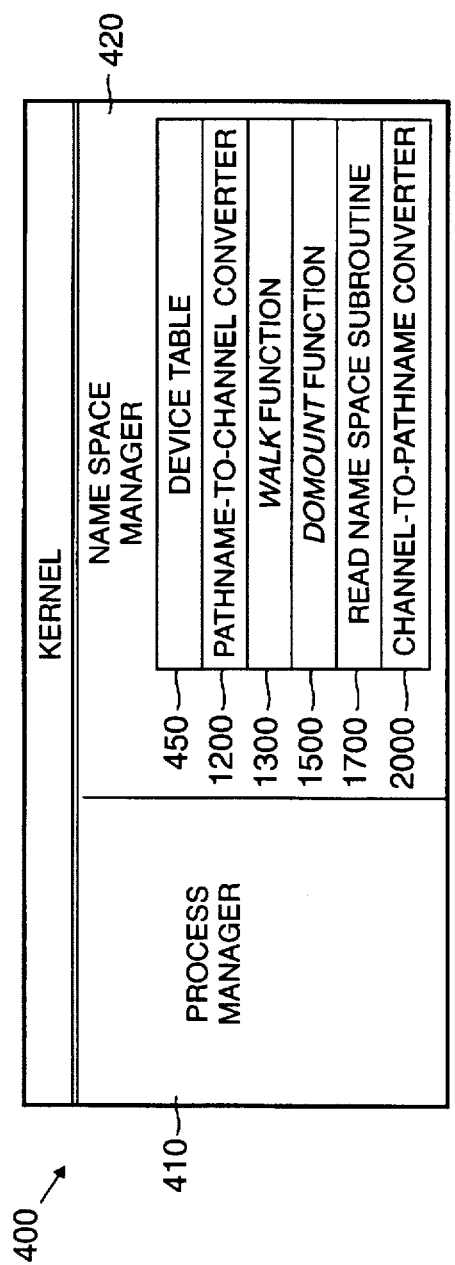
FIG. 4A illustrates an operating system kernel which incorporates features of the present invention.

In many distributed processing systems, such as the preferred Plan 9 distributed processing system, the operating system 275 is structured as a kernel 400, illustrated in FIG. 4A. A kernel 400 typically provides an interface to every resource in the distributed computing environment 100. Conceptually, a kernel 400 can be viewed as having a process manager 410, as well as a name space manager 420. The process manager 410 typically includes program code for controlling memory management, process scheduling, and control of the fork system call. Since process managers 410 are well known and have been discussed in detail elsewhere, the process manager 410 will be discussed herein only to the extent necessary to provide a clear understanding of the present invention.

As previously indicated, the kernel 400 provides an interface to every resource in the distributed computing environment 100, whether or not the resource is actually implemented by the kernel 400. In the Plan 9 distributed processing system, for example, the name space manager 420 includes a device table 450, devtab, discussed below in conjunction with FIG. 4B, which serves as the interface to every device in the distributed computing environment 100.

In order to resolve names in the name space of a user or a process, the name space manager 420 includes a pathname-to-channel convertor 1200, discussed below in conjunction with FIG. 12. As indicated above, a user can specify a particular file to be operated on in terms of a pathname in the user's name space. The pathname-to-channel convertor 1200 will translate the pathname into the particular channel data structure representing the file to be operated on.

Figure 15:
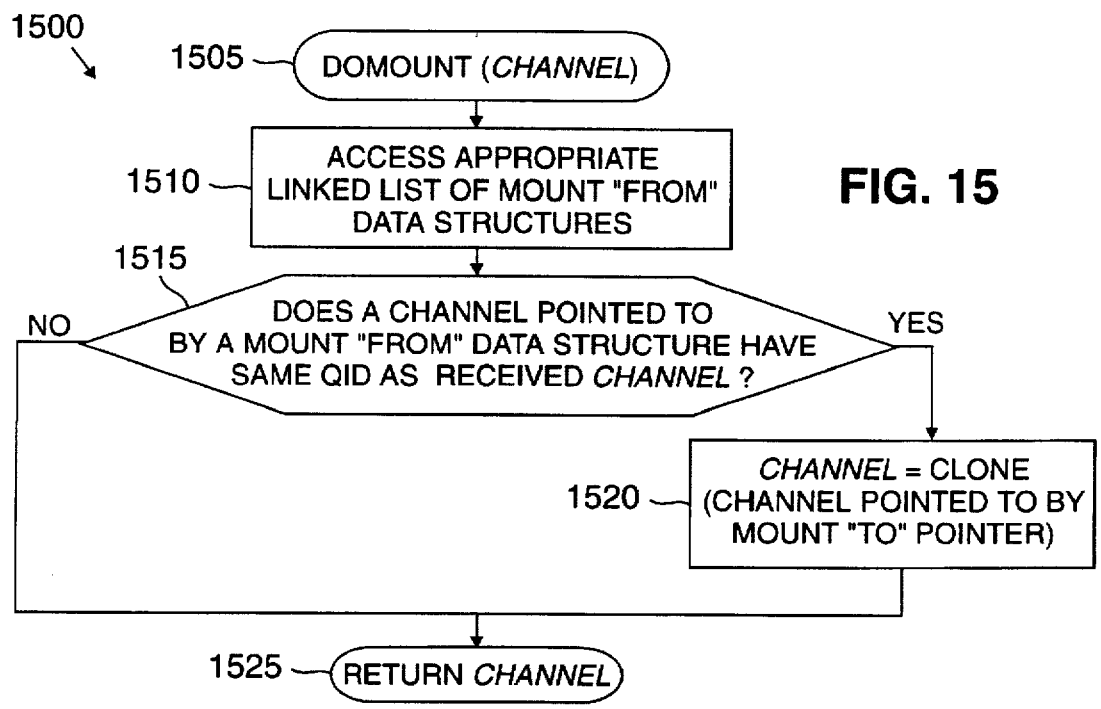
FIG. 15 is a flow chart describing a domount function which may be utilized to access the mount table of FIG. 8A to determine whether a particular channel has been mounted upon, and if so, perform the necessary channel substitution.

In addition, the kernel 400 preferably implements a walk function 1300, discussed below in conjunction with FIG. 13, to move from one level of the file tree to another. A domount function 1500, discussed below relative to FIG. 15, is preferably provided by the kernel 400 to take a channel, determine if its meaning has been altered by being bound or mounted upon, and if so, perform the necessary channel substitution. A read name space subroutine 1700, shown in FIG. 17, during the exportation of a process to a remote processor, will preferably access the mount table 800 to generate a list comprised of the "from" and "to" files associated with each bind and mount command that form the current state of the local name space. Finally, the kernel 400 preferably provides a channel-to-pathname convertor 2000, discussed below in conjunction with FIG. 20, which translates a given channel into its corresponding pathname, in the name space of the server that provides the file.

Figure 4B:
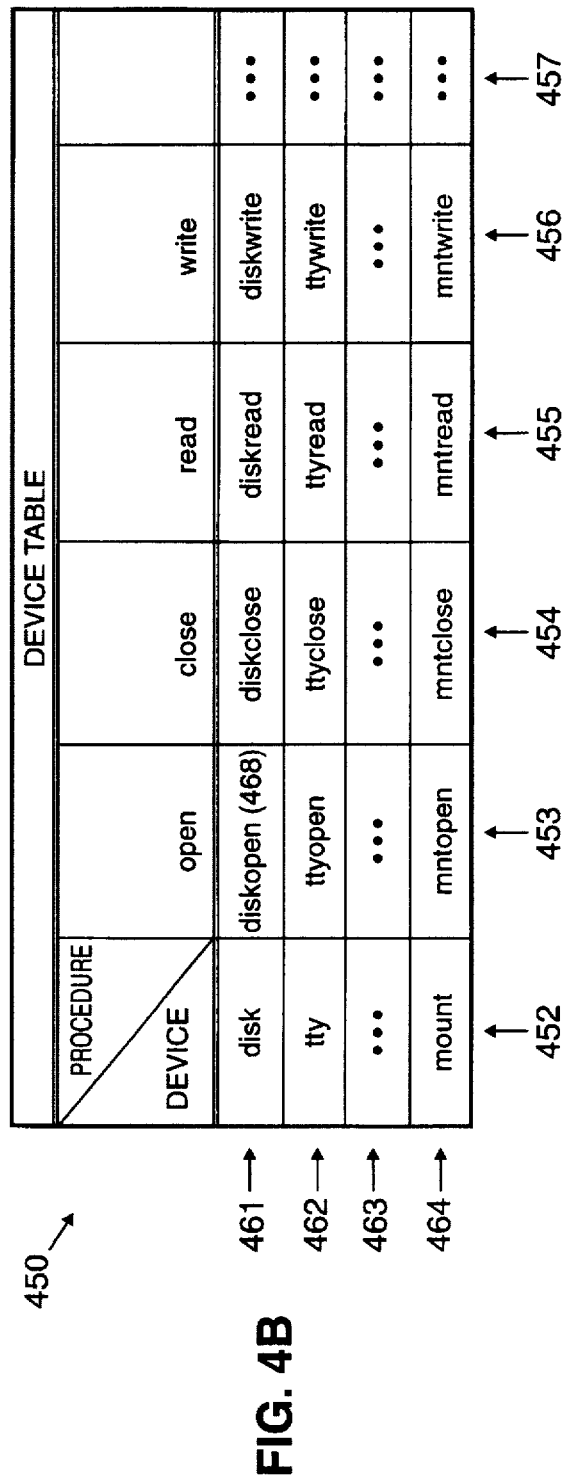
FIG. 4B illustrates a device table, suitable for use by the kernel of FIG. 4A to store an array of pointers to device-specific procedure calls.

As shown in FIG. 4B, the device table 450 is preferably implemented as an array of device-specific procedure calls that are utilized to perform a desired file operation on a file provided by a particular device. The device table 450 includes a pointer to a procedure call for every operation, such as open, read and write, that can be performed on a file provided by a particular device. Thus, each kernel resident device is implemented by a device driver containing a procedure for each primitive operation.

As shown in FIG. 4B, the device table 450 includes a plurality of rows, such as the rows 461-464, each associated with a particular kernel-implemented device, such as a disk device or a teletype (tty) device. In addition, the device table 450 includes a plurality of columns, such as the columns 452-457. The entries in column 452 of the device table 450 indicate the particular device associated with a given row in the table 450. The remaining columns, such as the columns 453-457, are each associated with a particular procedure call. For example, in order to open a file provided by the disk device associated with row 461, the kernel 400 should execute the procedure call diskopen, indicated in cell 468 of the device table 450.

Figure 4C:
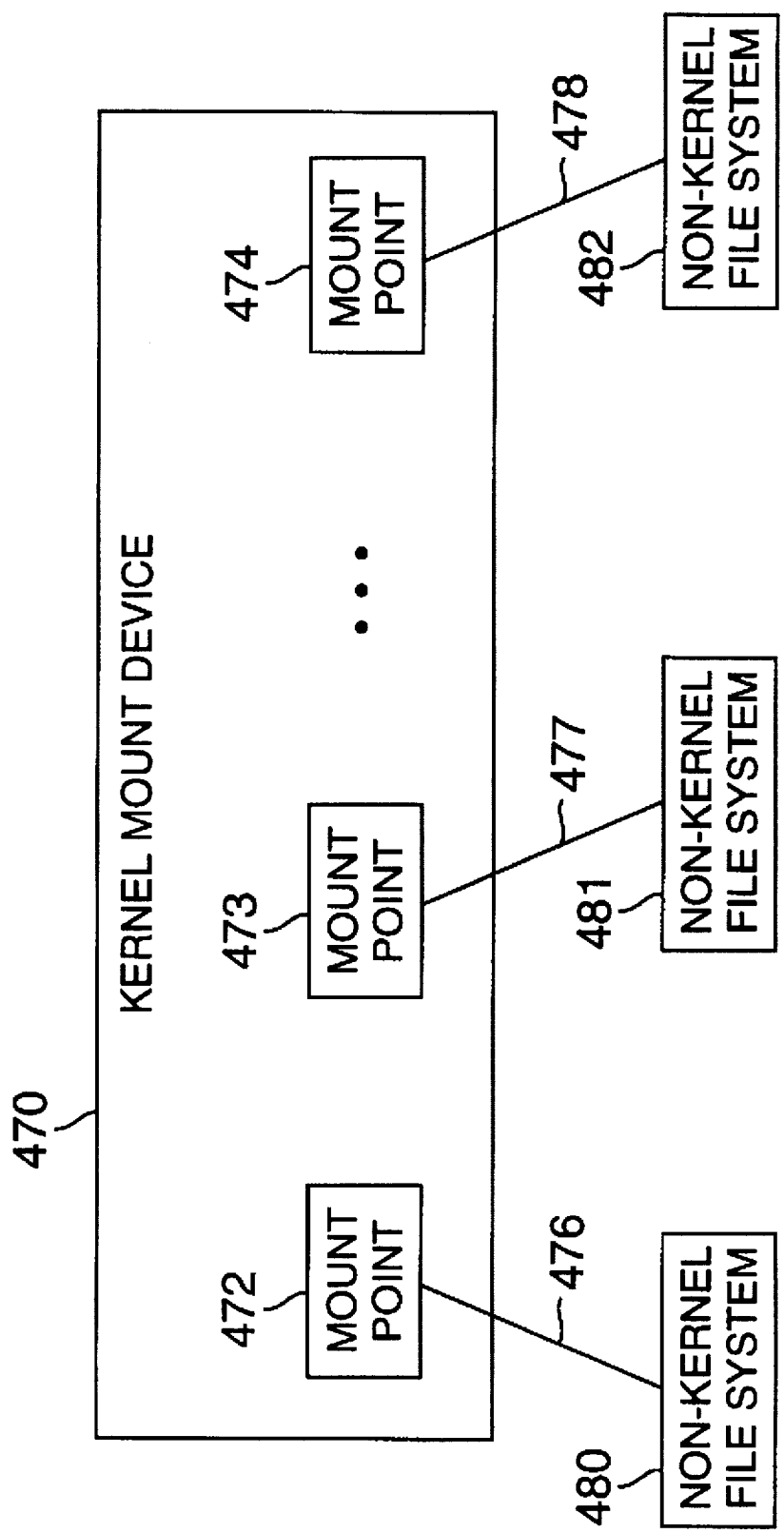
FIG. 4C illustrates a mount device, suitable for use by the kernel of FIG. 4A as an interface to the devices in the distributed computing environment of FIG. 1 not implemented by the kernel.

It is noted that the entries in row 464 of the device table 450 are associated with a special kernel device, referred to as the mount device 470, or mount driver, shown in FIG. 4C. The mount device 470 is a portion of the kernel 400 which provides an interface to all of the devices, such as the file systems 480–482, in the distributed computing environment 100 that are not implemented by the kernel 400. It is noted that a non-kernel file system 480–482 may reside on the same node in the distributed computing environment 100 as the kernel 400, or on a remote node.

When the non-kernel file system 480–482 is resident on the same node as the kernel 400, interprocess communication is preferably by means of a conventional pipe. In addition, when the non-kernel file system is located on a remote node, interprocess communication is by means of one or more network connections. As discussed further below in conjunction with FIG. 7, the mount device represents the communication link 476–478, which may be a pipe or a network connection, to the non-kernel file system 480–482 as a mount point, such as the mount points 472–474, consisting of a plurality of related data structures.

It is noted that the mount device 470 will preferably provide a single mount point 472–474 for each connected non-kernel file system, such as the file systems 480–482. Thus, any process wishing to access a given remote file system will utilize the same mount point 472–474. Accordingly, the mount device 470 must be able to demultiplex transmissions received for the one or more processes which may be communicating with the associated remote service.

In a distributed computing environment 100, file operations are frequently performed on remote files. Generally, a first process, desiring to perform an operation on a remote file, will send a message to a second process that provides the file. The transmitted message requests the second process to perform a particular task on the indicated file. Once the second process has performed the requested task, the second process will return a reply to the first process with the result, which may be just an acknowledgement.

The mount device 470 preferably acts as an intermediary between the first and second processes to translate the procedure call executed by the first process into file operation messages that may be transmitted to the second process over an established communication link, such as the links 476–478. The file operation messages transmitted across the communication link are referred to as remote procedure calls (RPCs), discussed below in conjunction with FIG. 7.

Thus, if a process wishes to perform a particular operation on a file provided by a non-kernel file system, such as the file systems 480–482, the process will execute the procedure call corresponding to the desired operation. The kernel will recognize that the file is provided by a non-kernel file system and thereafter utilize the mount device 470 to translate the procedure call into the appropriate remote procedure calls. The remote procedure call message will request the remote file system to perform the desired task. Thereafter, the remote file system will send a reply to the mount device 470. The mount device 470 will, in turn, forward the results of the file operation to the requesting process. Thus, the mount device 470 hides the details of sending and receiving the request and reply messages behind the procedural interface.

Accessing Resources In The Distributed System

When a particular file is opened by a process, the kernel 400 typically assigns a file descriptor, fd, or a numeric label, to the file. In addition, the kernel 400 utilizes a kernel data structure, hereinafter referred to as a channel, discussed below in conjunction with FIG. 6, to represent each file that a process may access in the name space. The kernel 400 maps the file descriptor, fd, to an assigned file, by using a file descriptor array 500, shown in FIG. 5. Each entry in the file descriptor array 500 is indexed by a file descriptor, fd, and contains a pointer in column 504 to the particular channel, such as the channels 520–521, associated with the file descriptor indicated in column 502.

In a preferred embodiment, the kernel 400 maintains a file descriptor array 500 for each active process. Thus, the set of channels 520–522 pointed to by the file descriptor array 500 represents the collection of files to which the particular process is connected, in other words, the set of files in the name space of the associated process.

Figure 5:
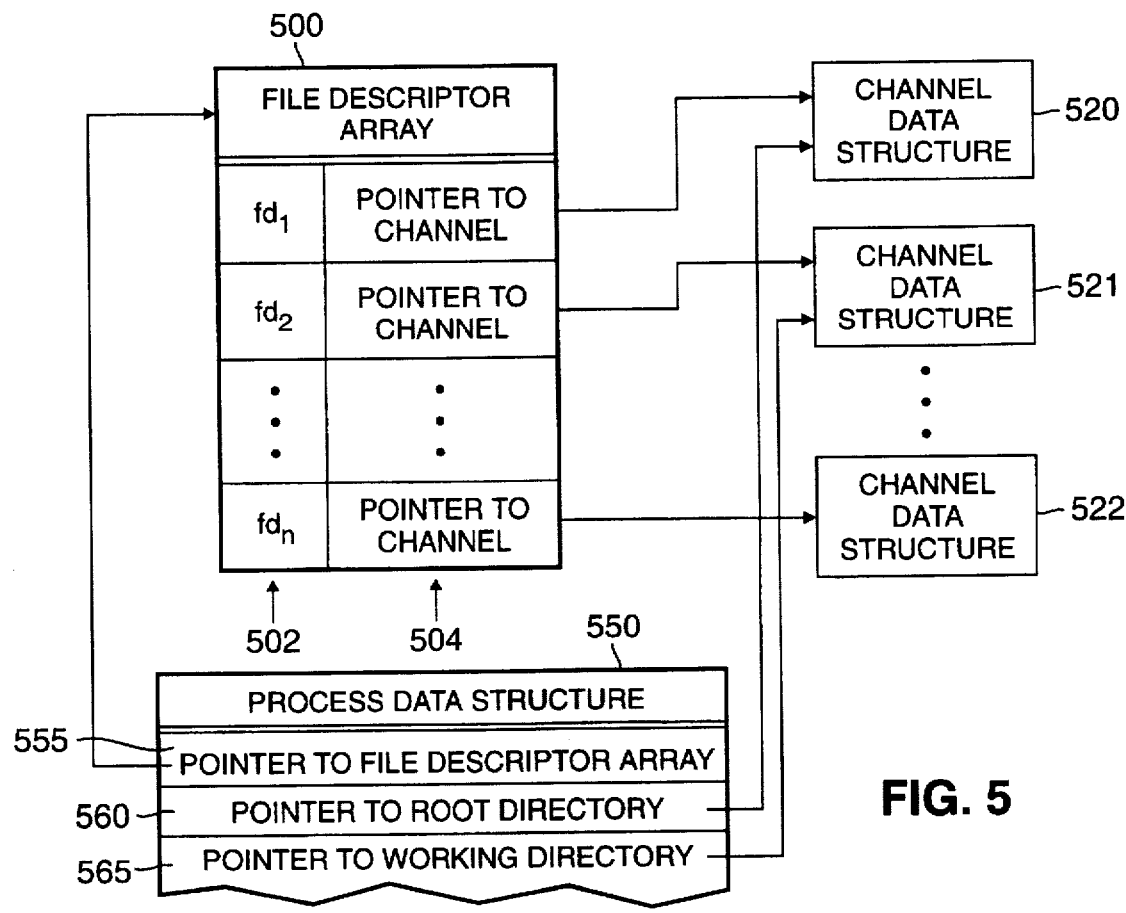
FIG. 5 illustrates a partial view of a process data structure and a file descriptor array, suitable for storing file access information for a particular process.

In addition, the kernel 400 preferably also maintains a process data structure 550, shown in FIG. 5, for each active process. The process data structure 550 stores information necessary to manage the execution of the process, in a known manner. The process data structure 550 includes, among other things, an entry 555 for storing a pointer to the file descriptor array 500 associated with the process. In addition, the process data structure 550 includes an entry 560 for storing a pointer to the channel 520 corresponding to the root directory, /, in the name space of the process, and an entry 565 for storing a pointer to the channel, such as the channel 521, corresponding to the current working directory in the name space of the process.

Figure 6:
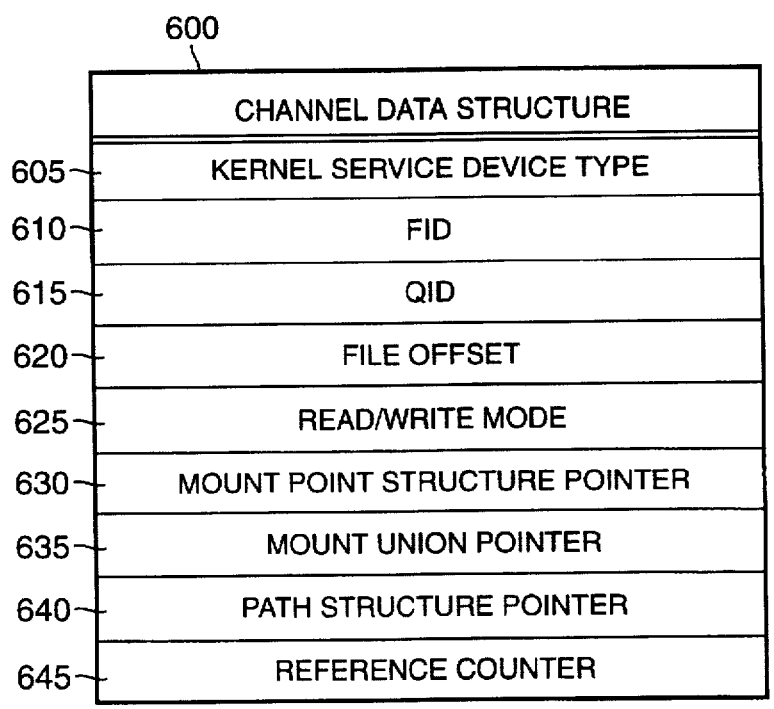
FIG. 6 illustrates a channel data structure, utilized by the kernel of FIG. 4A to represent a particular file, and to store information related to the file.

As previously indicated, the kernel 400 utilizes a kernel data structure, referred to as a channel, to represent each file that a given process may access in the name space. One suitable implementation of a channel data structure 600 is illustrated in FIG. 6. The channel 600 preferably includes an element 605 for recording the type of kernel service device which provides the corresponding file, such as the disk device or the tty device. The kernel service device type is utilized as an index into the device table 450, and thereby allows the procedure call corresponding to the appropriate device to be performed on the file. It is noted that for a non-kernel implemented file, the kernel service device type will indicate the mount device 470.

For example, if a particular process desires to read a file, the process will execute a read command with the appropriate arguments, including the file descriptor, fd, indicating the channel associated with the file to be read. The kernel 400 will utilize the file descriptor, fd, to access the appropriate channel 600, by means of the file descriptor array 500, and thereafter identify the kernel service device type providing the file, indicated in data structure element 605. Thereafter, the device type is used an index into the device table 450 to implement the procedure call corresponding to the particular device.

In addition, the channel 600 preferably includes an element 610 for storing a file identifier, fid, assigned by the local kernel 400 to identify the file associated with the channel 600 and an element 615 for storing a qid, which is a unique number assigned by the server which provides the file to each file in the server's file tree. It is noted that although a given process may have more than one channel 600 pointing to the same file, each having a different file identifier, fid, each channel pointing to the same file will have the same unique qid. Since the type field identifies the resource that provides the file, the qid and type values may be utilized to uniquely identify any file and thus, to determine whether two different channels or file identifiers, fids, point to the same file.

The channel 600 preferably also includes a pair of elements for storing information utilized when executing a read or write command on the associated file. An element 620 preferably stores the current offset into the file associated with the channel, which indicates the position of the associated file at which the next read or write command will begin. In addition, an element 625 preferably indicates the mode with which the file may be accessed, in other words, whether the file may only be read, written or both.

As previously indicated, if a file is provided by a non-kernel file system, the respective file is accessed indirectly through a mount point, discussed below in conjunction with FIG. 7, provided by the mount service 470. The mount point consists of a plurality of data structures representing the communication link to the non-kernel file system. Thus, if a channel 600 represents a file provided by a non-kernel file system, an element 630 in the channel 600 is preferably populated with a pointer to the appropriate mount point structure, shown in FIG. 7, representing the communication link to the desired non-kernel file system, such as a remote file server.

In addition, as discussed above, a user can utilize name space modification commands to create a union directory in the name space, consisting of at least two directories. Thus, a channel in the name space is made equivalent to the union directory, and is then said to represent the union directory. When a channel 600 represents a union directory, an element 635 in the channel 600 is preferably populated with a pointer to the current directory in the union directory. As discussed below in conjunction with FIG. 13, a walk function 1300 can be utilized to step through each element of the union directory. Preferably, the pointer 635 is appropriately updated as the channel 600 points at different elements of the union directory.

As indicated above, the present invention provides data structures for storing name space or path information that allows the file pathname corresponding to a given channel to be accurately reproduced. According to one feature of the present invention, discussed below in conjunction with FIG. 11C, a path data structure 1140, associated with each file, stores the name of the file, and additional information that allows the path through the name space to the particular file to be determined. Thus, each channel 600 preferably contains an element 640 for storing a pointer to the path structure 1140 associated with the given file represented by the channel.

Finally, each channel 600 preferably includes a reference counter 645 which monitors the number of pointers currently pointing to the particular channel. Thus, when the reference counter is zero, indicating that there are no pointers currently pointing to the channel, the data structure may be freed, in a known manner.

Communicating With Non-Kernel File Systems

As previously indicated, each file in the name space of a particular user or process is represented by a channel data structure, such as the channel 600, whether or not the file is maintained by the local kernel 400 or by a non-kernel file system. When a particular channel 600 represents a non-kernel implemented file, however, the respective file is accessed indirectly through a mount point, such as the mount points 472–474 shown in FIG. 4C, provided by the kernel mount service 470. It is again noted that the mount service 470 will preferably create a single mount point, such as the mount point 472, for each connected non-kernel file system, such as the device 480. Thus, the created mount point 472–474 may be utilized by a plurality of processes wishing to access files provided by the associated non-kernel file system.

a. Creation of the Communication Link

When a process initially attaches to a non-kernel file system 750, shown in FIG. 7, such as a remote file server, a communication link 740 must be established to the device 750. As previously indicated, if the non-kernel file system 750 is resident on the same node in the distributed computing environment 100, the communication link 740 is preferably embodied as a conventional pipe. If, however, the non-kernel file system 750 is resident on a remote node in the distributed computing environment 100, then the communication link 740 is a network connection.

Typically, an operating system will provide a pipe system call which, when executed, will create a conventional interprocess communication pipe and return two file descriptors, $fd_1$ and $fd_2$, identifying channels representing each side of the pipe. The pipe is accessed by the appropriate file descriptor, $fd_1$ or $fd_2$, like an ordinary file. Thus, the non-kernel file system 750 will read and write remote procedure calls from one side of the created pipe, using the first file descriptor, $fd_1$, while the one or more processes communicating with the non-kernel file system 750 can utilize the second file descriptor, $fd_2$, to read and write from the other side of the pipe.

If, however, the non-kernel file system 750 is resident on a remote node in the distributed computing environment 100, then the communication link 740 is a network connection. Typically, the operating system associated with a distributed processing system will provide a command for creating a network connection to a remote file server. In the preferred Plan 9 distributed processing system, for example, a network connection is created by executing a dial command, with the appropriate arguments, such as the symbolic name or network address of the desired destination.

As discussed below in conjunction with FIG. 9A, the dial command uses a network data base 900, if necessary, to translate the symbolic name to a network destination address. Thereafter, the dial command attempts to create a network connection to the indicated network address in the distributed computing environment 100. Once the desired network connection has been established, the dial command will return a file descriptor, fd, identifying a channel 730 that represents the created network connection. The manner in which a channel, such as the channel 730, can be utilized to transmit and receive messages on the network connection is discussed below in conjunction with FIG. 9B.

Thus, the channel 730, shown in FIG. 7, is identified by the file descriptor, fd, that is returned from the pipe or dial command. The channel 730 represents the communication link 740, which may be a pipe or a network connection communicating with the non-kernel file system 750.

In a preferred embodiment, when an application program creates a pipe or a network connection, in the manner just described, to communicate with a particular non-kernel file system, the returned file descriptor, fd, identifying the channel 730, which represents the created communication link 740, is posted in a file in a predefined place in the local name space. In one embodiment, discussed below in conjunction with FIG. 10, a file is created in a special kernel device, /srv, for each mount point 710, to store the file descriptor, fd, or pointer which identifies the channel 730.

In this manner, before creating a new connection to a non-kernel file system, such as the device 750, the files in the /srv directory can be searched to determine if a connection to the particular non-kernel file system has already been established. If a previously established connection to the desired non-kernel file system is found, the file descriptor, fd, representing the communication link can be retrieved from the file in the /srv directory and mounted in the desired place in the name space.

b. Creation of the Mount Point

In addition to the channel 730, which represents the communication link 740 to the non-kernel file system 750, the mount device 470 preferably allocates a mount point data structure 710 for storing access and path information regarding the non-kernel file system 750. The mount point data structure 710 preferably includes a pointer 712 to the channel data structure 730 that represents the communication link 740 to the non-kernel file system 750. In addition, the mount point data structure 710 preferably includes a queue 714, which contains a list of tags, each associated with an outstanding remote procedure call message, which will allow the mount point 710 to direct a reply received on the communication link 740 to the appropriate requesting process.

According to a feature of the present invention, the mount point data structure 710 also preferably includes a pointer 716 to a server tree path table 1100, discussed below in conjunction with FIG. 11A, which stores pointers to data structures containing name space information for each of the accessed files in the tree of the non-kernel file system 750. As discussed below, the stored name space information allows the file tree of the non-kernel file system to be generated.

In a preferred implementation, one channel, such as the channel 705, is automatically allocated upon creation of the mount point 710 to represent the root directory, /, of the file tree provided by the non-kernel file system 750. As indicated above, when a channel, such as the channel 705, represents a remote file, the element 630 in the channel data structure is preferably populated with a pointer to the appropriate mount point structure 710, which provides access to the communication link 740 to the desired remote file server 750.

As previously indicated, every channel, such as the allocated channel 705, will include a file identifier, fid, indicated in element 610 of the channel structure. The mount device 470 will preferably transmit an attach remote procedure call, including the file identifier, fid, indicated in element 610 of channel 705, to the non-kernel file system 750 across the communication link 740. The attach remote procedure call instructs the non-kernel file system 750 to point the indicated file identifier, fid, at the root of the file tree provided by the non-kernel file system 750.

In a preferred embodiment, the channel 705 will point at the root directory of the file tree of the non-kernel file system 750, for as long as the communication link 740 to the device 750 is maintained. Thus, if a user or process wishes to access other files in the file tree of the non-kernel file system 750, the channel 705 should be copied using a clone command, in a known manner. Thus, the mount table 800 will not be modified each time a file provided by the non-kernel file system 750 is accessed. The copy of channel 705 will initially point at the root directory, /, of the non-kernel file system 750. The copy of channel 705 can then be manipulated to point at other files in the file tree of the non-kernel file system 750, by executing a walk command 1300 to move from one level of the file tree to another, as discussed below in conjunction with FIG. 13. These commands are typically transmitted to the non-kernel file system 750 by means of remote procedure calls.

c. Mounting the Root Directory of a Non-Kernel File System

As indicated above in conjunction with FIG. 3A, the file tree of the non-kernel file system 750 can be positioned in the local name space by making the channel 705, which represents the root directory of the non-kernel file system 750, equivalent to a file already in the local name space. In other words, a mount command can be executed to mount the channel 705 upon a file, represented by a channel, in the name space. For example, if the communication link 740, shown in FIG. 7, represents the connection from the terminal 305 to the remote file server 310, shown in FIG. 3A, then the channel 705 represents the root, /, of the name space 325 of the server 310. Thus, to position the file tree of the server 310 in the name space 320 associated with the terminal 305, the channel 705 should be mounted upon the file, X, in the terminal's name space 320.

Figure 8B:
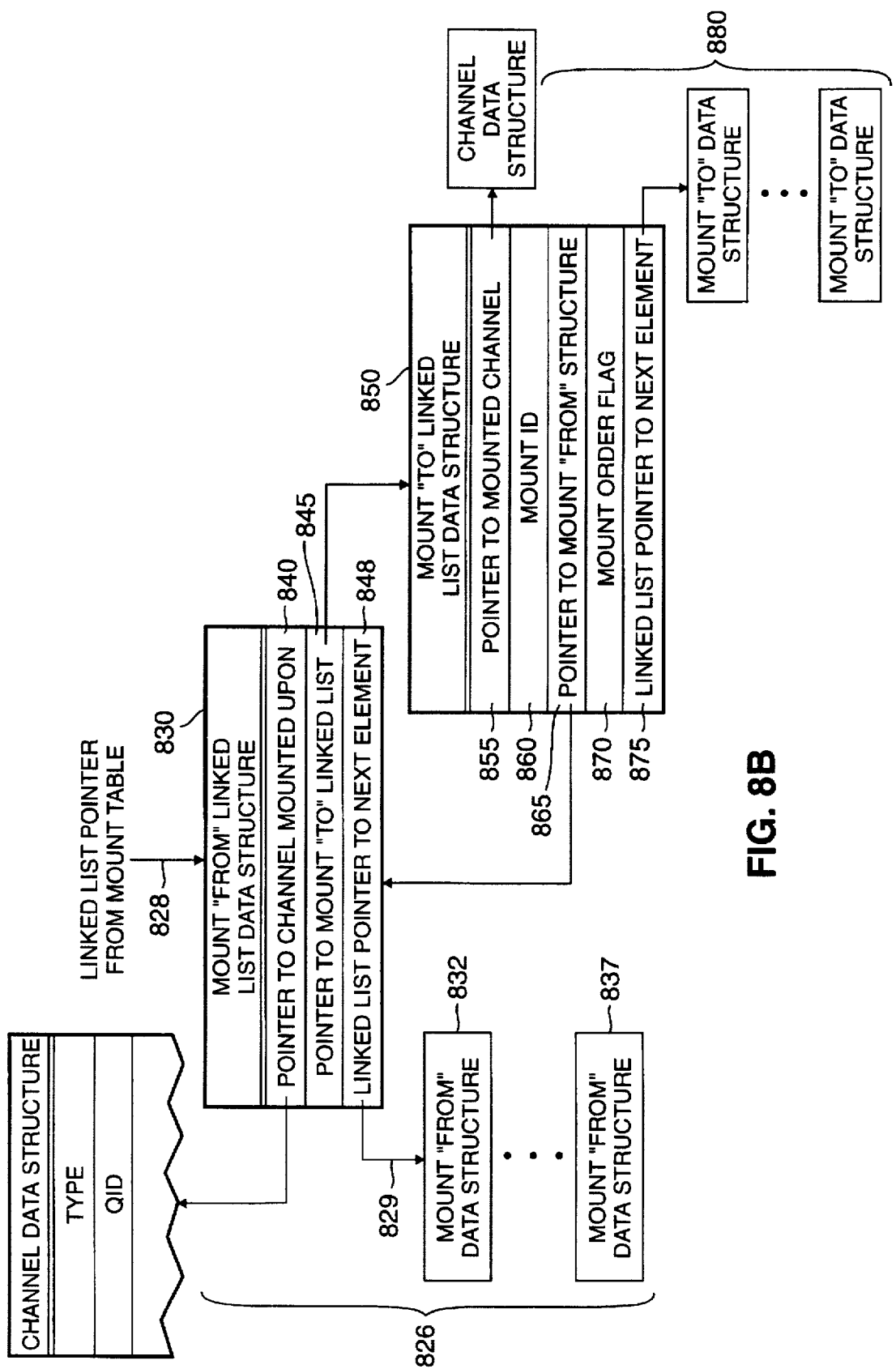
FIG. 8B illustrates a mount "from" data structure and at least one mount "to" data structure, which together form an entry in the mount table of FIG. 8A.

As previously indicated, the kernel 400 utilizes a mount table 800 and related data structures, shown in FIGS. 8A and 8B, to store the series of binds and mounts executed by a user or process to form the local name space. Thus, continuing the example of FIGS. 3A and 3B, if a user operating on the name space 320', associated with the terminal 305, attempts to open a file, /X/D, the kernel will utilize the mount table 800 to interpret the request to access file X, and any files below file X in the hierarchy, as references to a file, such as the file D, in the file tree of the file server 310. In a preferred embodiment, the kernel 400 will execute a pathname-to-channel convertor 1200, discussed below in conjunction with FIG. 12, each time a file is accessed using a pathname, which will, among other things, determine if a channel substitution is necessary due to a bind or a mount command.

It is noted that the arguments of a bind or mount command are a "from" channel and a "to" channel. Thus, each entry in the mount table 800 will be comprised of pairs of "from" and "to" entries. If a channel appears in the mount table 800 as a "from" channel, then another channel has been mounted upon this channel, and a channel substitution must be performed.

Accordingly, each time a file is accessed using a pathname, the kernel 400 will convert the pathname to the corresponding channel and then search the mount table 800 to determine if the particular channel has been mounted upon, in other words, if the channel appears in the list of mount "from" channels. If the channel is found in the list of mount "from" channels, the corresponding mount "to" entry in the mount table 800 will be retrieved to perform the necessary channel substitution.

As indicated above, the qid and type values stored in elements 615 and 605, respectively, of each channel, such as the channel 600, uniquely identify the file corresponding to the channel. Thus, channels are preferably identified in the mount table by their qid and type values. In a preferred embodiment, entries in the mount table 800 are indexed by a hash value based on the qid value of the channel which has been mounted upon. Thus, to determine if a particular channel has been mounted upon, the mount table 800 is entered with the corresponding qid value. Thereafter, the list of mount "from" channels are searched for channels having the same qid and type values. If a match is found, the kernel will perform the channel substitution indicated by the corresponding mount "to" channel entry.

Conceptually, the mount table 800 can be viewed as a top-level data structure, comprised of a pair of columns 805 and 810. Each entry in the hash address column 805 is populated with a unique hash value, which serves as an index or address for each row of the mount table 800, such as the rows 815, 820 and 825.

It is noted that a number of different qid values may hash to the same hash value. Accordingly, each row of the mount table 800, such as the row 820, may be associated with a plurality of channels which have been mounted upon, each uniquely identified by the qid and type values. Thus, the corresponding entry in the "pointer to linked list" column 810, if populated, will preferably contain a pointer 828 to a linked list of data structures 826, comprised of structures 830, 832 and 837, associated with the hash value.

The presently preferred embodiments of the mount "from" and mount "to" data structures are shown in FIG. 8B. Generally, as shown in FIG. 8A, each data structure in the linked list of mount "from" data structures 826, such as the structures 830, 832 and 837, will have a pointer, such as the pointer 829, to the next data structure in the linked list. The final data structure 837 in the linked list will preferably have a null pointer, as shown in FIG. 8A.

As previously indicated, each entry in the mount table 800 will be comprised of a "from" data structure, representing the channel mounted upon, and at least one "to" data structure, representing the one or more mounted channels. As shown in FIG. 8B, the linked list pointer 828 from the top-level mount table 800 will point to a mount "from" data structure 830 in the linked list 826.

A mount "from" data structure, such as the structure 830, preferably contains an entry 840 for storing a pointer to the channel which has been mounted upon, as well as an entry 845 for storing a pointer to an associated mount "to" data structure 850. It is noted that if the mounted channel is part of a union directory, the mount "to" data structures will be a linked list of structures, such as the linked list 880. In addition, each mount "from" data structure, such as the structure 830, will preferably contain an entry 848 for storing a pointer 829 to the next element in the linked list 826.

In a preferred embodiment, the kernel 400 includes a domount function 1500, illustrated in FIG. 15, which will take a channel, determine if its meaning has been altered by being mounted upon, and if so, perform the necessary channel substitution. As discussed below, the domount function 1500 will retrieve the qid from the received channel, generate the hash value, and utilize the linked list pointer 828 from the appropriate entry in column 810 to access the appropriate linked list of mount "from" data structures, such as the linked list 826. Thereafter, the kernel 400 will successively follow the pointer to each mount "from" structure, such as the structure 830, in the linked list of data structures 826 to determine if a channel pointed to by a mount "from" structure in the linked list has the same qid and type values as the channel that was passed to the domount function 1500.

If a channel is found having matching qid and type values, the pointer in entry 845 of the mount "from" structure 830 is followed to the first element of the associated linked list 880 of mount "to" data structures, such as the data structure 850. Preferably, each mount "to" linked list data structure 850 contains an element 855 for storing a pointer to the mounted channel. In addition, the mount "to" linked list data structure 850 preferably includes an element 860 for storing a mountid value which uniquely identifies the entry in the mount table 800. In a preferred embodiment, the mountid value is incremented each time an entry is added, and thereby serves as a time stamp which allows the mount table entries to be retrieved from the mount table 800 in the order in which the corresponding bind and mount commands were executed.

In addition, the mount "to" linked list data structure 850 preferably contains an element 865 for storing a pointer back to the associated mount "from" linked list data structure 830.

In addition, the mount "to" linked list data structure 850 contains an element 870 for storing the mount order flags that were specified in the bind or mount command associated with the mount table entry. In other words, whether the associated bind or mount command indicated that the current directory in the union directory should be before or after the other directories in the union. Finally, the mount "to" linked list data structure 850 preferably contains an entry 875 for storing a pointer to the next element in the linked list 880 of mount "to" data structures.

NETWORK REPRESENTATION

As previously indicated, a network data base 900, shown in FIG. 9A, may be utilized to provide translations between symbolic machine names and network destination addresses. When establishing a network connection, for example, a user or process may request a connection to a desired remote machine, identified by a symbolic machine name. Thus, during the connection phase, the network data base 900 is accessed to translate the indicated symbolic name to a corresponding network destination address. In addition, according to a feature of the invention discussed below, when recreating the name space it is often necessary to translate a network destination address back into a symbolic machine name.

Thus, the network data base 900, shown in FIG. 9A, is preferably comprised of a pair of columns 925 and 930. Each row in the data base 900, such as the rows 905, 910 and 915, is preferably associated with a particular remote machine. Thus, each entry in column 925 indicates the symbolic machine name associated with the particular machine. The associated entry in column 930 preferably contains a list of the networks to which the particular machine is connected, together with the appropriate network destination address. Thus, the machine helix, for example, has a destination address 135.104.9.31 on the ip network.

In this manner, if a user or process requests a network connection to a particular remote machine, such as the machine helix, the kernel 400 will access the appropriate entry in the network data base 900 and retrieve the corresponding network destination addresses of the machine. Preferably, a connection will be attempted to each retrieved destination address, in turn, until a successful connection is established.

A network, like any other resource in the distributed computing environment 100, is preferably represented as a hierarchical file system. FIG. 9B illustrates a portion of the name space 950 related to networks. The name space 950 preferably contains a directory, /net, which contains a subdirectory for each network that may be accessed, such as the networks il and tcp. In addition, each network directory, such as the network directory /net/il, preferably contains a clone file and a set of numbered directories, each corresponding to a network connection. Each numbered directory contains files to control and communicate on the associated connection.

As discussed below, a new network connection is allocated by opening the clone file in the network directory of the desired network, such as the file /net/il/clone, to reserve an unused connection. The file descriptor, fd, returned by the open command will identify a channel which points to the control file of the new connection. Thereafter, to establish the connection, an ASCII address string is written to the control file of the new connection, such as "connect 135.104.9.30!17008" to connect to the bootes machine on the il network.

Thereafter, reads and writes to the associated data file will allow data to be received and transmitted on the established connection, respectively. It is noted that the listen file is used to accept incoming calls from the network, the local file typically contains addressing information, and the remote and status files provides information on the connection status. For further details on the creation and utilization of network connections in a distributed computing environment 100, such as the Plan 9 distributed computing system, see David Presotto & Philip Winterbottom, "The Organization of Networks in Plan 9", Proc. of the Winter 1993 USENIX Technical Conference, San Diego, Calif., pp. 43–50 (1993), incorporated by reference herein.

As discussed above in conjunction with FIG. 7, each time a communication link, such as a pipe or a network connection, is established to a non-kernel file system, the file descriptor, fd, which is returned by the pipe or dial command to identify the channel which represents the created communication link, is preferably posted in a file in a predefined place in the local name space. In one embodiment, illustrated in FIG. 10, a file is created in a directory, /srv, for each created mount point to store the file descriptor, fd, or pointer, which identifies the channel representing the communication link.

In the illustrative implementation, files created in the /srv directory for storing a pointer to a channel corresponding to a pipe are named in accordance with the following convention: programname.username.procid. Thus, the file, 8½.philw.35, stores a pointer to a channel associated with a pipe to the Plan 9 window system, 8½, for the user, philw. Similarly, files created in the /srv directory for storing a pointer to a channel corresponding to a network connection are named in accordance with the following convention: network!machine name. Thus, the file, il!bootes, stores a pointer to a channel associated with a network connection to the machine bootes across the il network.

In this manner, before creating a new connection to a non-kernel file system, such as the device 750, the files in the /srv directory can be searched to determine if a connection to the particular non-kernel file system has already been established. Thus, if a connection to a desired non-kernel file system has already been established, the channel indicated in the /srv directory can be mounted into the desired place in the name space.

In addition, the information stored in the files in the /srv directory may be utilized to identify the pipes and network connections when packaging the name space for transmission to the cpu server, during the exportation of a processing task, as described below in conjunction with FIG. 16A.

NAME SPACE INFORMATION DATA STRUCTURES

As previously indicated, the list of mounts and binds executed by a user or process to form the name space can preferably be retrieved from the mount table 800 in the order in which they were executed. It is noted, however, that the list of bind and mount commands retrieved from the mount table 800 is in terms of the particular channel data structures that were bound or mounted, and is not in terms of file pathnames.

Thus, according to further features of the invention, path data structures, shown in FIGS. 11A through 11C, store path information which allows the pathname corresponding to each channel to be determined. In addition, as discussed below, the stored path information allows the name space of the accessed files in the tree of each connected non-kernel file system to be recreated.

As previously indicated, the mount point data structure 710, discussed above in conjunction with FIG. 7, which provides access to a remote server, includes a pointer 716 to a server tree path table 1100, shown in FIG. 11A. The server path tree table 1100 stores pointers to data structures containing path information for each of the accessed files in the hierarchical file tree of the non-kernel file system 750 associated with the mount point 710. The stored path information allows the file tree of the non-kernel file system to be generated, in a manner described below.

As shown in FIG. 11A, the server tree path table 1100 preferably consists of a pointer 1102 to the path data structure associated with the channel representing the root directory of the particular non-kernel file system, such as the channel 705 representing the root directory of the remote file system 750. As discussed below, the pointer 1102 to the path data structure of the root of the non-kernel file system can be utilized to identify when the pathname has been reconstructed from a given file in the hierarchy all of the way back up to the root directory.

In addition, the server tree path table 1100 preferably includes a pointer 1104 to a server tree path list 1110, shown in FIG. 11B, which is preferably a list of pointers to the data structures containing path information for all of the accessed files in the file tree of the associated non-kernel file system. In a preferred embodiment, the entries in the server tree path list 1110 are based upon pathname information for a given file. In other words, in a preferred embodiment, entries in the server tree path list 1110 are indexed by a hash value based on the pathname of a given file. In this manner, the appropriate path data structure, such as the data structure 1140, associated with a given file can be easily identified for a file being accessed based upon a pathname, for example, during execution of the walk function 1300. It is noted that if path information is desired for a particular channel, the appropriate data structure can be directly accessed by retrieving the path structure pointer 640 from the channel 600.

Thus, to access the path information for a particular file, identified by its pathname, the server tree path list 1110 is entered with a hash value based on the pathname of the given file. Conceptually, the server tree path list 1110 can be viewed as a top-level data structure comprised of a pair of columns 1122 and 1124. Each entry in the hash address column 1122 is populated with a unique hash value, which serves as an index or address for each row of the server tree path list 1110, such as the rows 1115, 1118 and 1120.

It is noted that a number of different pathname values may hash to the same hash value. Accordingly, each row of the server tree path list 1110, such as the row 1118, may be associated with a plurality of path data structures. Thus, the corresponding entry in the "pointer to linked list" column 1124, if populated, will preferably contain a pointer 1128 to a linked list of data structures 1126, comprised of structures 1130, 1132 and 1137, associated with the hash value.

The presently preferred embodiment of a path data structure 1140 is shown in FIG. 11C. Generally, as shown in FIG. 11B, each data structure in the linked list of path data structures 1126, such as the structures 1130, 1132 and 1137, will have a pointer, such as the pointer 1129, to the next data structure in the linked list. The final data structure 1137 in the linked list will preferably have a null pointer, as shown in FIG. 11B.

Each path data structure, such as the data structure 1140, preferably contains an entry 1142 for storing the name of the associated file, an entry 1144 for storing a pointer to the path data structure of the parent to the current file, a reference counter 1146 and a linked list pointer 1148 to the next element in the linked list. As discussed below in conjunction with FIG. 20, the channel-to-pathname convertor 2000 will utilize the path data structures, such as the data structure 1140, to construct the pathname for a given file, represented as a channel. Generally, given a channel, the channel-to-pathname convertor 2000 will access the path data structure 1140 for the indicated file to retrieve its file name from entry 1142, and then successively follow the series of pointers to the path data structure of the parent file, retrieved from entry 1144, up the file tree to construct the pathname until the root directory is reached.

Name Space Process

As previously indicated, the kernel 400 provides a pathname-to-channel convertor 1200 for translating a given pathname in the name space of a user or process into the appropriate channel representing the indicated file. As indicated above, a user or process can perform a number of different file operations on a file, identified by a pathname in the name space of the user or process. Each of these file operations that receives a pathname argument to identify the file to be operated upon, will preferably call the pathname-to-channel convertor 1200 to translate the indicated pathname into the particular channel data structure, which represents the file, to be operated on.

As discussed below, the pathname-to-channel convertor 1200 is comprised of three main portions. Parts I and II will identify the appropriate channel which represents the directory containing the indicated file. It is noted that the different file operations that will call the pathname-to-channel convertor 1200 will be performing different tasks on the indicated file, identified by an access mode.

For most file operations, such as open or create, it is desired to perform all channel substitutions indicated in the mount table 800. When the file operation is set working directory or a mount command, however, the file operation should be performed on a channel representing the union directory itself, and not on a channel representing the first element in the union directory. In this manner, if a channel is inserted before the first element in the union by a subsequent bind or mount command, the new first element will still be pointed to by the channel representing the union directory. Thus, a third portion 1245 of the pathname-to-channel convertor 1200 will evaluate the received access mode argument and, where appropriate, will not perform any channel substitutions indicated in the mount table 800 on the final pathname element.

Figure 12A:
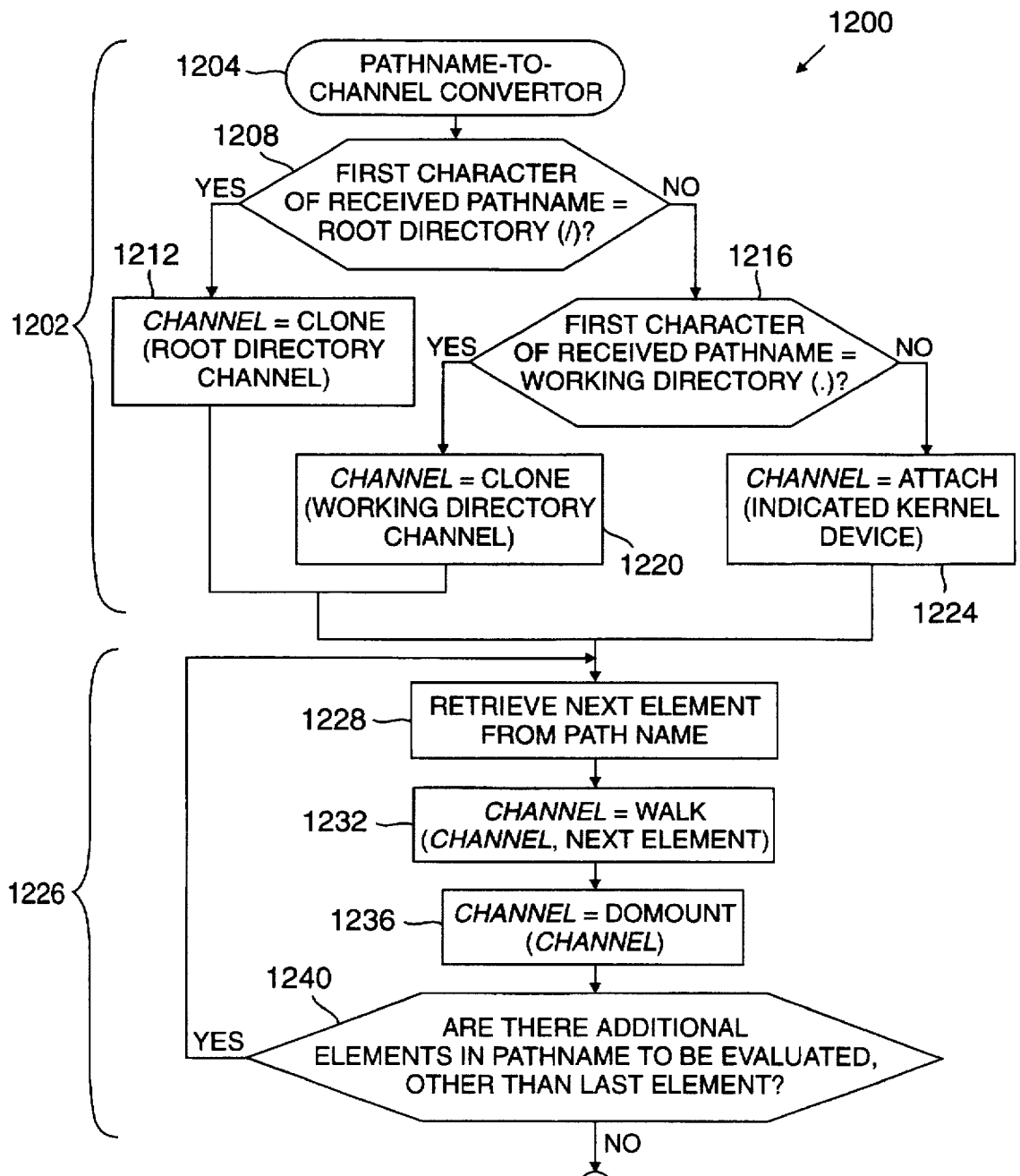
FIGS. 12A and 12B, collectively, are a flow chart describing a pathname-to-channel convertor which may be utilized to translate a given pathname into the appropriate file-like object, represented as a channel, to be operated upon.

As shown in FIG. 12A, the pathname-to-channel convertor 1200 is entered at step 1204, with an indicated pathname argument. During a first portion 1202 of the pathname-to-channel convertor 1200, corresponding to steps 1208 through 1224, the first element of the pathname is analyzed. It is noted that a pathname can typically start with one of three characters, each identifying a different origination point for the pathname. Thus, a test is performed during step 1208 to determine if the first character in the pathname argument is the slash character, indicating that the pathname has been specified relative to the root directory. If it is determined during step 1208 that the first character in the pathname argument does indicate the root directory, /, then the pointer to the channel representing the root directory is retrieved from element 560 of the process data structure 550 (FIG. 5) and the corresponding channel is cloned, or copied, during step 1212.

If, however, it is determined during step 1208 that the first character in the pathname argument does not indicate the root directory, /, then a test is performed during step 1216 to determine if the first character in the pathname argument is the dot character, ., indicating that the pathname has been specified relative to the current working directory. If it is determined during step 1216 that the first character in the pathname argument does indicate the working directory (.), then the pointer to the channel representing the working directory is retrieved from element 565 of the process data structure 550 (FIG. 5) and the corresponding channel is then cloned, or copied, during step 1220.

If, however, it is determined during step 1216 that the first character in the pathname argument does not indicate the working directory (.), then the first character must be the hash character, #, indicating that the pathname has been specified relative to a kernel device. Thus, the kernel device identified by the second character of the pathname, such as #p, indicating the process device, is attached during step 1224. The file descriptor, fd, that is returned by the attach command, in a known manner, is assigned to the variable, channel.

Following execution of the first portion 1202 of the pathname-to-channel convertor 1200, the variable, channel, contains a channel representing the directory or file indicated by the first element of the pathname argument. During a second portion 1226 of the pathname-to-channel convertor 1200, corresponding to steps 1228 through 1240, each successive element of the pathname argument is traversed until the final element of the pathname is reached.

The next element of the pathname argument is retrieved during step 1228. Thereafter, the walk function 1300, discussed below in conjunction with FIG. 13, is executed during step 1232, with the current value of the variable, channel, and the next element retrieved during the previous step. The result of the walk function 1300 is assigned to the variable, channel. Generally, the walk function 1300 will search the directory represented by the current value of channel, for the file or directory indicated by the next element in the pathname.

Following execution of the walk function during step 1232, a domount function 1500, discussed below in conjunction with FIG. 15, is executed during step 1236. Generally, the domount function 1500 will access the mount table 800 to determine whether the channel represented by the current value of the variable channel has been mounted upon. If the channel corresponding to the current value of the variable channel has been mounted upon, the value of the variable channel will be translated by the domount function 1500 to indicate the channel which has been mounted.

Thereafter, a test is performed during step 1240 to determine if there are additional elements in the pathname argument to be evaluated, other than the last element. If it is determined during step 1240 that there are additional elements in the pathname argument to be evaluated, then program control will return to step 1228 to continue processing the remaining pathname elements in the manner described above.

Figure 12B:
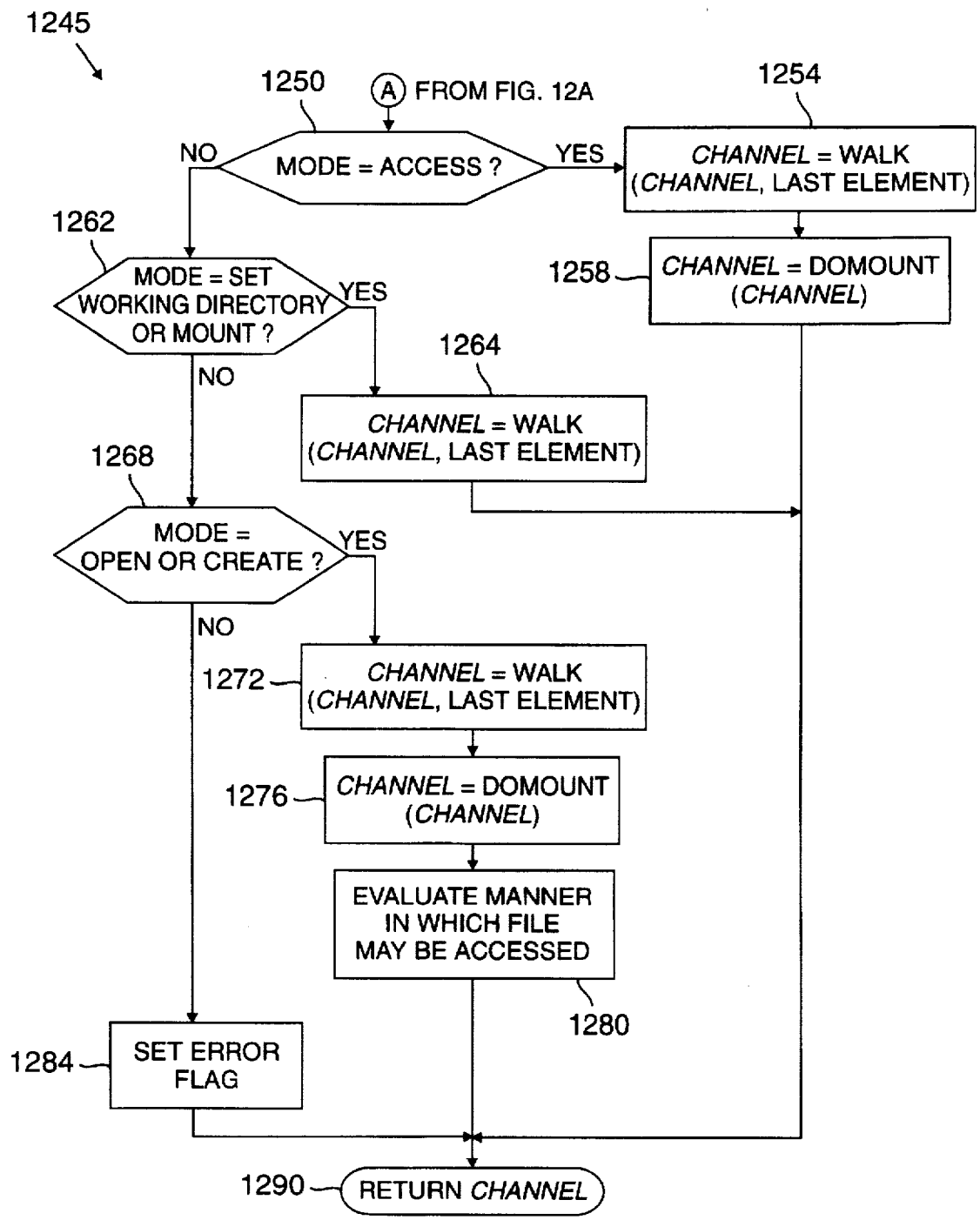

If, however, it is determined during step 1240 that there are no additional elements in the pathname argument to be evaluated, other than the last element, then program control will proceed to step 1250 (FIG. 12B). Following execution of the second portion 1226 of the pathname-to-channel convertor 1200, the variable, channel, is pointing to the next to last path element in the indicated pathname, in other words, the directory containing the file (or directory) identified by the pathname argument.

As previously indicated, an argument received by the pathname-to-channel convertor 1200 identifies the access mode of the current file operation. As indicated above, the access mode will determine whether any channel substitutions indicated in the mount table 800 should be performed on the last element of the pathname. The third portion 1245 of the pathname-to-channel convertor 1200, corresponding to steps 1250 through 1290, evaluates the access mode argument and identifies the appropriate channel that represents the file.

A test is performed during step 1250 to determine if the current access mode is access. If it is determined during step 1250 that the current access mode is access, then the walk function 1300, illustrated in FIG. 13, is executed during step 1254, with the current value of the variable, channel, and the last element of the pathname. The result of the walk function 1300 is assigned to the variable, channel. The walk function 1300 will search the directory represented by the current value of channel, for the file or directory indicated by the last element in the pathname.

Following execution of the walk function during step 1254, the domount function 1500, illustrated in FIG. 15, is executed during step 1258. The domount function 1500 will access the mount table 800 to determine whether the channel represented by the current value of the variable channel has been mounted upon and if so, the value of the variable channel will be translated to indicate the channel which has been mounted. Thereafter, program control will return to the calling file operation during step 1290 with the current value of the variable, channel, which now represents the file to be operated upon.

If, however, it is determined during step 1250 that the current access mode is not equal to access, then a test is performed during step 1262 to determine if the current access mode equals set working directory or mount. If it is determined during step 1262 that the current access mode is equal to set working directory or mount, then it is desired to have the channel represent the union directory itself, and not the first element in the union. Thus, the walk function 1300, illustrated in FIG. 13, is executed during step 1264, with the current value of the variable, channel, and the last element of the pathname to search the directory represented by the current value of channel, for the file or directory indicated by the last element in the pathname. The result of the walk function 1300 is assigned to the variable, channel. Thereafter, program control will return to the calling file operation during step 1290, without calling the domount function 1500, with the current value of the variable, channel.

If, however, it is determined during step 1262 that the current access mode is not equal to set working directory or mount, then a test is performed during step 1268 to determine if the current access mode is equal to open or create. If it is determined during step 1268 that the current access mode is equal to open or create, then the walk function 1300, illustrated in FIG. 13, is executed during step 1272, with the current value of the variable, channel, and the last element of the pathname to search the directory represented by the current value of channel, for the file or directory indicated by the last element in the pathname. The result of the walk function 1300 is assigned to the variable, channel.

Following execution of the walk function during step 1272, the domount function 1500, illustrated in FIG. 15, is executed during step 1276. The domount function 1500 will access the mount table 800 to determine whether the channel represented by the current value of the variable channel has been mounted upon and if so, translate the value of the variable channel to indicate the channel which has been mounted.

It is noted that the task of opening a file requires certain permissions to be verified. Thus, during step 1280, the manner in which the file may be accessed is evaluated.

Thereafter, program control will return to the calling file operation during step 1290 with the current value of the variable, channel, which now represents the file to be operated upon.

If, however, it is determined during step 1268 that the current access mode is not equal to open or create, then all of the valid access modes have been attempted and the current access mode must be an error. Thus, an error flag is preferably set during step 1284, before program control returns to the calling file operation.

Figure 13:
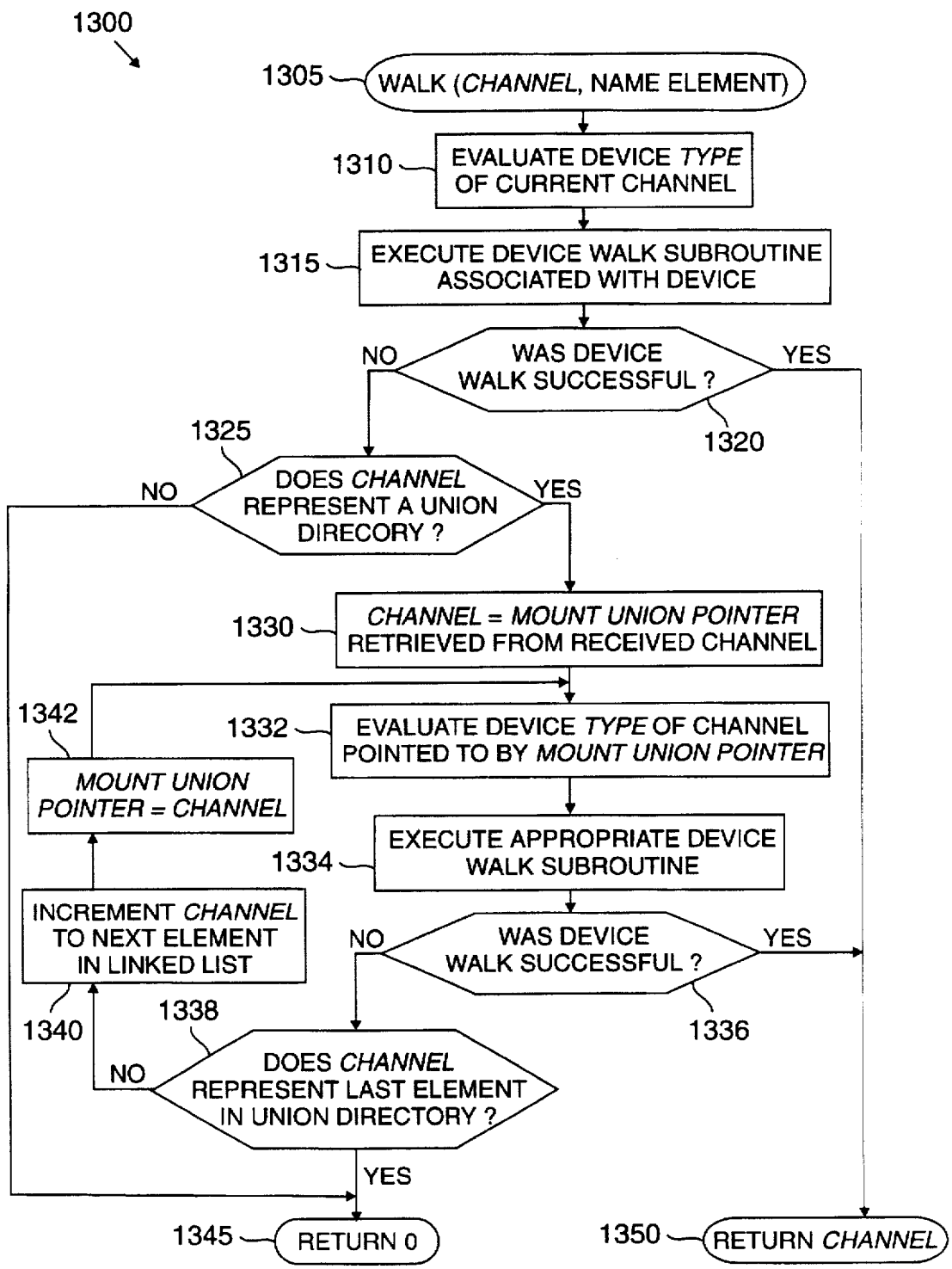
FIG. 13 is a flow chart describing a walk function which may be utilized to move from one level of a file tree to another.

As previously indicated, the walk function 1300 shown in FIG. 13, will receive a channel and a pathname element as arguments. As discussed below, the walk function 1300 will search the directory represented by the current value of channel, for the file or directory indicated by the pathname element. The walk function 1300 will utilize a device walk subroutine 1400, shown in FIG. 14, to actually determine if the particular directory has the indicated file. In addition, since the received channel will point to a new file upon a successful walk, the device walk subroutine 1400 will also update the appropriate path data structures 1140, if necessary.

The walk function 1300 is preferably entered at step 1305, as shown in FIG. 13. The arguments of the walk function 1300 include a channel representing a directory to be searched for a particular file, indicated by a given name element.

The kernel service device type element 605 of the indicated channel, such as the channel 600, is evaluated during step 1310 to identify the kernel device that provides the file. As previously indicated, the kernel service device type is utilized as an index into the device table 450. Thus, the appropriate device walk subroutine, as indicated by the entry in the column of the device table 450 corresponding to the walk operation, is executed during step 1315. An illustrative device walk subroutine 1400 is discussed below in conjunction with FIG. 14. As previously indicated, the device walk subroutine 1400 will determine if the channel representing the indicated directory has the file identified by the received pathname element and, if successful, will also update the appropriate path structures 1140.

Thereafter, a test is performed during step 1320 to determine if the device walk subroutine 1400 was successful. In other words, whether the file indicated by the name element argument was found in the directory represented by the channel argument. If it is determined during step 1320 that the device walk subroutine 1400 was successful, then the current value of the variable, channel, is returned, which now points to the file indicated by the received path name element.

If, however, it is determined during step 1320 that the device walk subroutine 1400 was not successful, the received channel may represent a union directory which contains the file. Thus, a test is performed during step 1325 to determine if the received channel represents a union directory. If it is determined during step 1325 that the channel does represent a union directory, then the mount union pointer is retrieved from element 635 of the received channel, such as the channel 600. As previously indicated, when a channel, such as the channel 600 represents a union directory, the mount union pointer 635 will point to a channel representing the current directory in the union directory.

Thereafter, the kernel service device type element 605 of the channel pointed to by the mount union pointer 635, such as the channel 600, is evaluated during step 1332 to identify the kernel device type that provides the directory, which serves as an index into the device table 450. Thus, the appropriate device walk subroutine is executed during step 1334. A test is performed during step 1336 to determine if the device walk subroutine 1400 executed during step 1334 was successful. In other words, whether the file indicated by the name element argument was found in the current directory pointed to by the mount union pointer 635. If it is determined during step 1336 that the device walk subroutine 1400 was successful, then the current value of the variable, channel, is returned, which now points to the file indicated by the path name element, during step 1350.

If, however, it is determined during step 1336 that the device walk subroutine 1400 was not successful, then other directories, if any, are evaluated. Thus, a test is performed during step 1338 to determine if the current channel being evaluated represents the last element in the union directory, in other words, whether the pointer to the next element of the linked list 880, retrieved from element 875 of the mount "to" data structure 850, is null.

If it is determined during step 1335 that the current channel being evaluated does not represent the last element in the union directory, then the value of channel is preferably incremented during step 1340 to the channel corresponding to the next element in the linked list 880 which forms the union directory. In addition, the value of the pointer 635 in the channel which the union directory has been mounted upon is preferably updated during step 1342 to indicate the current directory in the union pointed to by channel. Thereafter, program control will return to step 1332 and continue in the manner described above.

If, however, it is determined during step 1338 that the current channel being evaluated does represent the last element in the union directory, then the file indicated by the path name argument is not in the channel represented by the received channel argument, or in a union directory which may have been mounted upon that channel. Thus, the walk not successful, and the walk function 1300 will preferably return to the calling operation during step 1345, with a value of zero.

Figure 14:
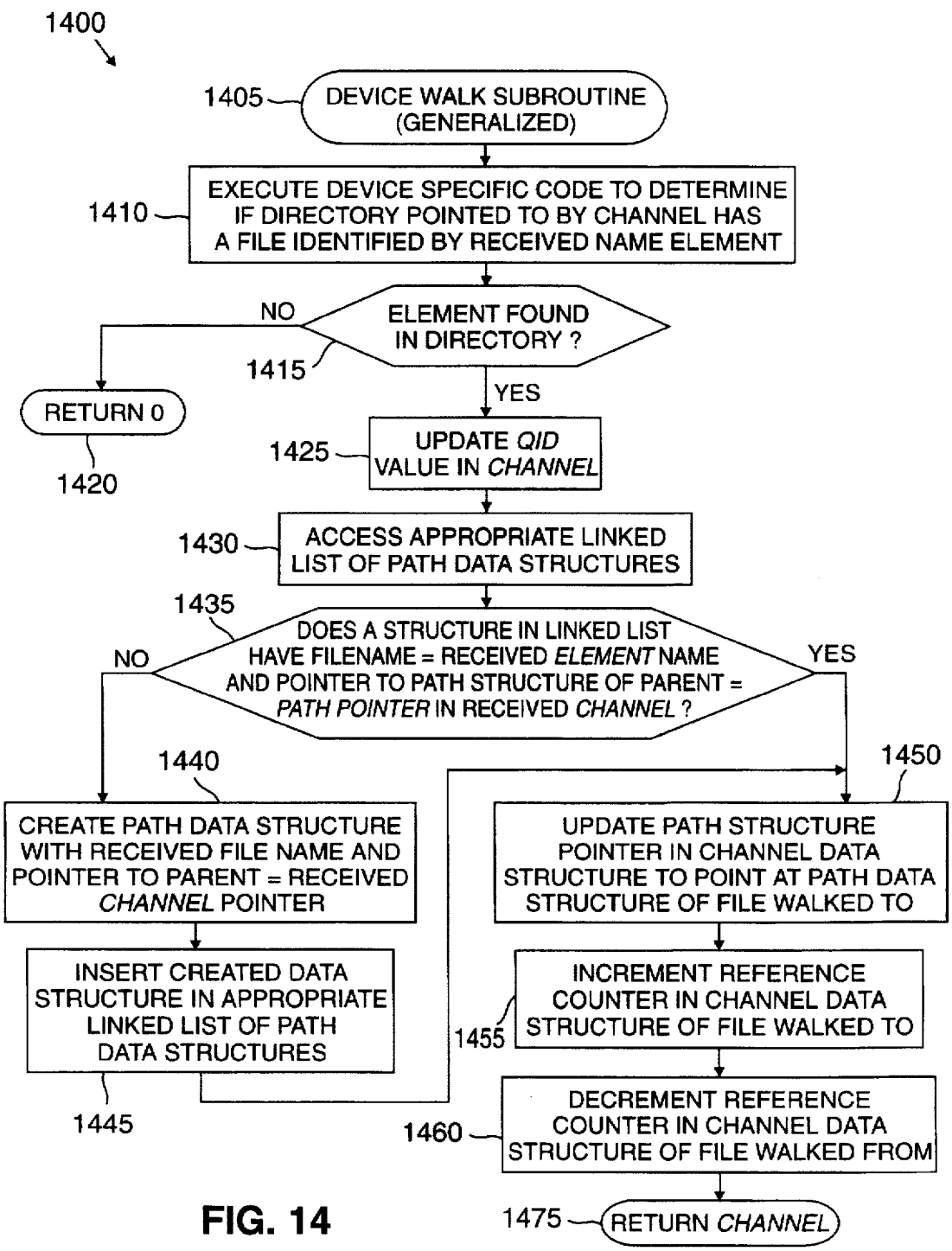
FIG. 14 is a flow chart describing a device walk subroutine which may be utilized by the walk function of FIG. 13 to search the directory of a given device for a particular file.

As indicated above, the walk function 1300 will utilize a device walk subroutine 1400, shown in FIG. 14, to determine if a particular directory, identified by a received channel, has an indicated file, identified by a received pathname element. In addition, since the received channel will point to a new file upon a successful walk, the device walk subroutine 1400 will also update the appropriate path structures 1140, if necessary.

As previously indicated, the walk function 1300 will access the device table 450 to execute the particular device walk subroutine 1400 that is suitable for the kernel device which provides the directory. Thus, each device walk subroutine 1400 will contain the specific code necessary to implement a walk function for that particular kernel device. The device-specific code is not pertinent here. Thus, the device walk subroutine 1400, shown in FIG. 14, has been generalized to illustrate the concepts pertinent to the present invention.

The device walk subroutine 1400 is entered at step 1405, as shown in FIG. 14. Thereafter, the device-specific code necessary to determine if the directory represented by the received channel argument contains a file identified by the received path name element argument is executed during step 1410. A test is performed during step 1415 to determine if the path name element argument was found in the indicated directory. If it is determined during step 1415 that the path name element argument was not found in the indicated directory, then the device walk was not successful, and the device walk function 1400 will preferably return to the calling walk function 1300 during step 1420, with a value of zero.

If, however, it is determined during step 1415 that the path name element argument was found in the indicated directory, then the device walk was successful, and the appropriate data structures must be updated during steps 1430 through 1460 to indicate that the received channel now points to the file indicated by the received pathname element. Thus, the element 615 of the received channel is preferably updated during step 1425 to reflect the qid value of the file identified by the path name element argument. It is again noted that the qid value is provided by the device which provides the file, and is obtained during execution of the device-specific code during step 1410.

Now that the received channel points to a new file, the pointer in the channel that points to the path data structure 1140 associated with the file must be updated as well. In addition, if the file now pointed to by the received channel has not been previously accessed, then a path data structure 1140 will have to be created.

As previously indicated, the server tree path list 1110 contains a list of pointers to all of the path data structures associated with device that provides the file. The server tree path list 1110 is preferably hashed by the pathname element and the pointer to the path data structure of the parent file. Thus, the appropriate hash value is utilized during step 1430 to access the appropriate linked list 1126 of path data structures. A test is performed during step 1435 to determine if a data structure in the linked list 1126 has a filename equal to the received pathname element argument and a pointer to parent path data structure value, retrieved from element 1144 of the path data structure 1140, equal to the pointer to path structure value indicated in element 640 of the received channel argument.

If it is determined during step 1435 that a data structure in the linked list 1126 does not have a filename equal to the received pathname element argument and a pointer to parent path data structure value 1144 equal to the pointer to path 640 indicated in the received channel, then the current file has not been previously accessed, and thus a path data structure has not previously been created for the file.

Thus, a path data structure 1140 is preferably created during step 1440 for the file with the file name element 1142 populated with the received path name element argument and the pointer 1144 to the parent path data structure equal to the received channel argument. The path data structure 1140 created during step 1440 is then inserted in the linked list 1126 of path data structures accessed during step 1430. Step 1445 may be implemented, for example, by copying the pointer 1128 to the linked list, if any, from the entry in column 1124 of the path tree list 1110 into the last element 1148 of the data structure 1140 created during step 1440, and then copying the pointer to the new created data structure into the entry in column 1124 of the server tree path list 1110 accessed during step 1430. Thereafter, program control will proceed to step 1450 and continue in the manner described below.

If, however, it was determined during step 1435 that a data structure in the linked list 1126 does have a filename equal to the received pathname element argument and a pointer 1144 to the parent path data structure equal to the received channel argument, then a path data structure 1140 has been previously created for the file. Thus, the path structure pointer 640 in the received channel is preferably updated during step 1450 to point at the path data structure of the file walked to, indicated by the received path name element argument.

The path structure pointer 640 in the received channel now points to the path data structure associated with the file walked to, and no longer points to the path data structure associated with the file walked from. Thus, the reference counter 1146 in the path data structure 1140 associated with the file walked to is preferably incremented during step 1455 and the reference counter 1146 in the path data structure associated with the file walked from is preferably decremented during step 1460. In this manner, a count of the number of pointers currently pointing to each structure is maintained.

Thereafter, program control will preferably return to the walk function 1300 with the current value of the variable, channel, during step 1475.

As previously indicated, the kernel 400 includes a domount function 1500, illustrated in FIG. 15, which will receive a channel argument, and access the mount table 800 to determine whether the channel represented by the received channel argument has been mounted upon. If the domount function 1500 determines that the channel corresponding to the current value of the variable channel has been mounted upon, the value of the variable channel will be translated to indicate the channel which has been mounted. The domount function 1500 will be entered at step 1505, with a received channel as an argument.

The domount function 1500 will preferably retrieve the qid value from element 615 of the received channel and implement the appropriate hash function on the qid value to access the appropriate linked list 826 of mount "from" data structures during step 1510. A test is performed during step 1515 to determine if a channel pointed to by a mount "from" data structure has the same qid value as the received channel argument. If it is determined during step 1515 that a channel pointed to by a mount "from" data structure does have the same qid value as the received channel argument, then the mount "to" pointer 845 is followed to the corresponding mount "to" data structure 850 to retrieve the pointer 855 to the mounted channel.

Thus, the channel pointed to by the mount "to" pointer 855 is cloned during step 1520 and reassigned to the variable, channel, during step 1520. It is noted that a channel in the mount table 800 is preferably cloned before being operating upon, so that the operations performed on the cloned channel do not affect the mount table 800.

If, however, it is determined during step 1515 that a channel pointed to by a mount "from" data structure 830 does not have the same qid value as the received channel argument, then the channel has not been mounted upon, and the channel value can be returned during step 1525, unaltered.

Export Processing to Remote Processor

As previously indicated, in a distributed system, such as the distributed computing environment 100, a user may export computation-intensive applications, such as compilation, to a remote processor, such as the cpu server 120, for example, by executing a cpu command. After the cpu command is executed by the user, a command prompt from a command interpreter will appear in the display window of the terminal, such as the terminal 105. However, the command interpreter is executing on the cpu server.

As discussed further below, the cpu command will induce the terminal to export an accurate description of the local name space to the cpu server 120. The cpu server 120 will utilize the received name space to assemble a name space substantially identical to the terminal's name space. In this manner, the cpu server 120 will see the same customized view of the distributed system 100 which has been assembled by the terminal.

Figure 16A:
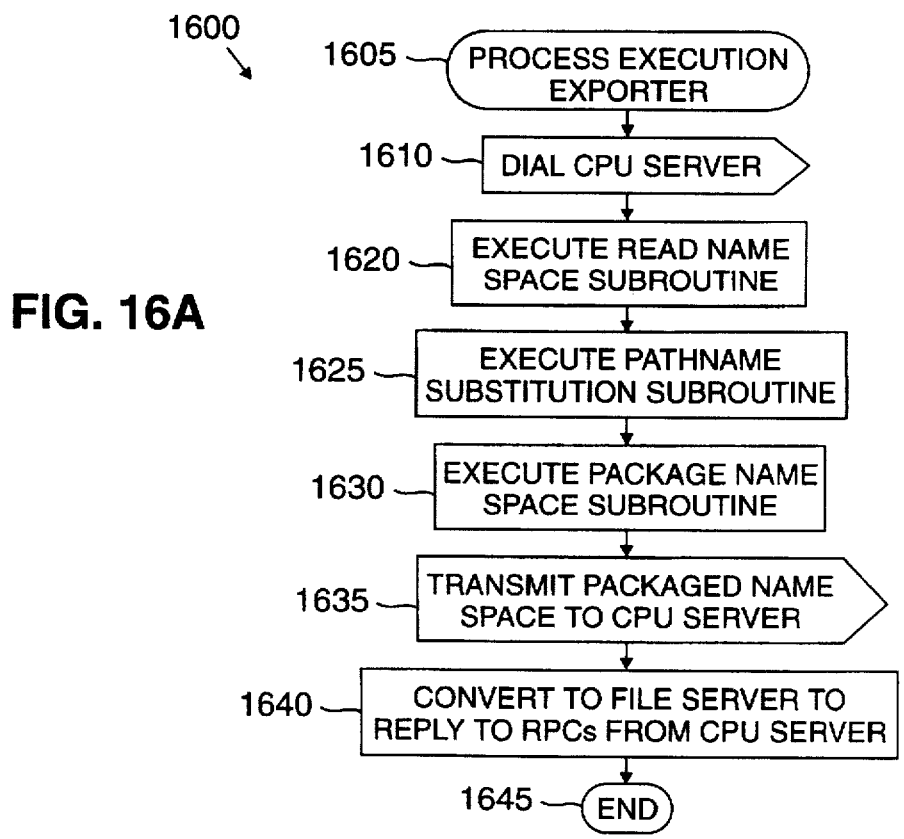
FIG. 16A is a flow chart describing a process execution exporter which may be utilized to export a processing task to a remote processor, together with an accurate representation of the name space of the exporting user or process.
Figure 16B:
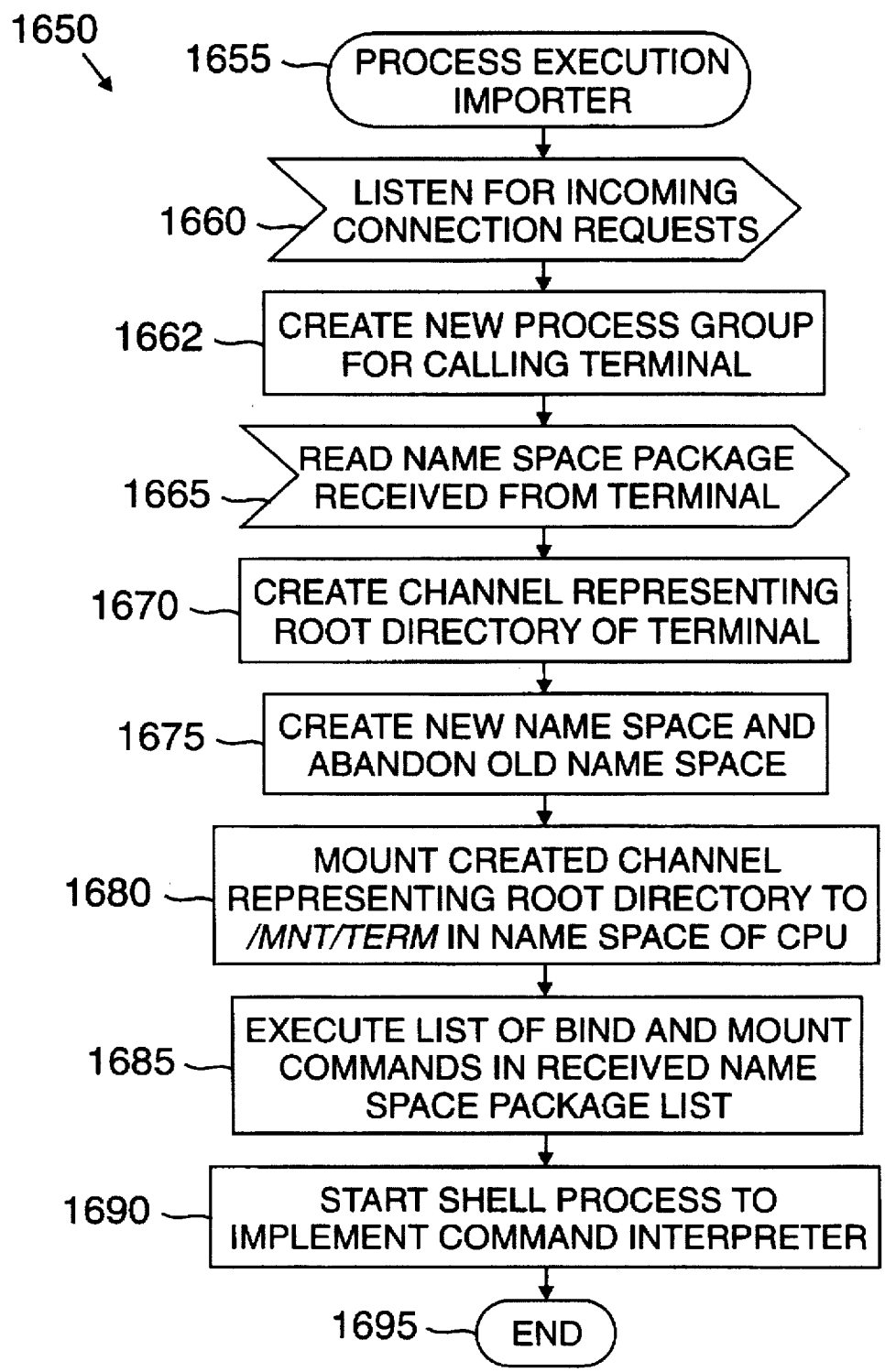
FIG. 16B is a flow chart describing a process execution importer which cooperates with the process execution exporter of FIG. 16A to import the processing task and to regenerate the name space of the exporting user or process.

In a preferred embodiment, the cpu command will invoke execution of a process execution exporter 1600, illustrated in FIG. 16A, on the user terminal 105. The process execution exporter 1600 will transmit messages to the selected cpu server 120, which will, in turn, invoke execution of a process execution importer 1650, illustrated in FIG. 16B, on the selected cpu server 120. As discussed below, execution of the process execution exporter 1600 and the process execution importer 1650 requires interaction between the two processes on the two remote processors. A convention has been adopted in the flow charts of FIGS. 16A and 16B to illustrate the transfer of signals between the various computing systems. When a processor is transmitting a signal to another processor, the process step is illustrated in a box shaped as a right-pointed arrow, such as step 1610 of FIG. 16A. Similarly, when a processor is receiving a signal transmitted from another terminal, the process step is illustrated in a flag-shaped box, such as step 1660 of FIG. 16B.

As illustrated in FIG. 16A, the process execution exporter 1600 will be entered at step 1605, for example, upon the execution of a cpu command by the user or a process. Thereafter, the process execution exporter 1600 will dial the selected remote processor, such as the cpu server 120, during step 1610, in a known manner. According to a feature of the present invention, an accurate representation of the current state of the local name space will be generated and transmitted to the selected cpu server 120.

Figure 17:
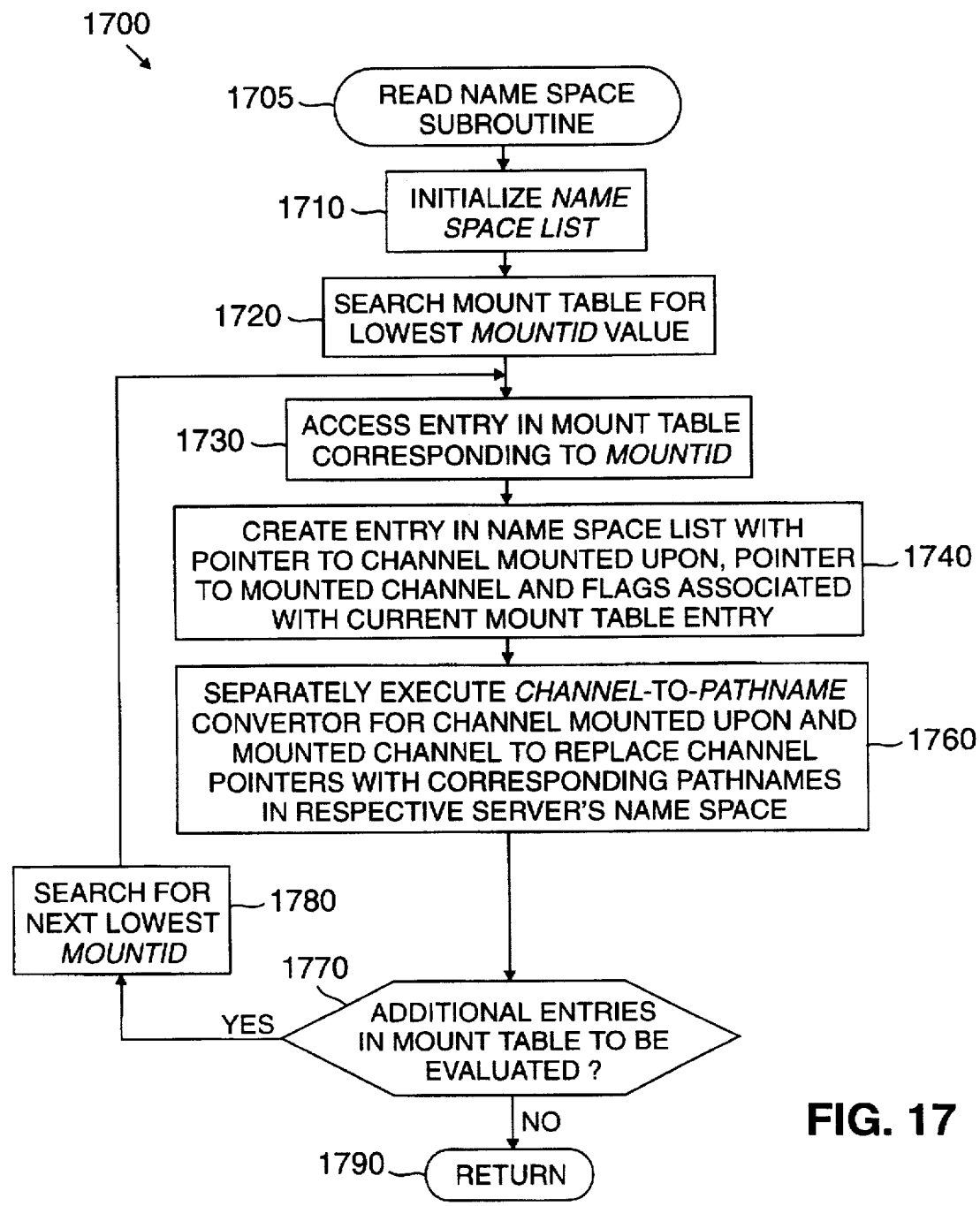
FIG. 17 is a flow chart describing a read name space subroutine which may be utilized by the process execution exporter of FIG. 16A to access the mount table of FIG. 8A to generate the list of bind and mount commands that form the name space of the exporting user or process.

Thus, a read name space subroutine 1700, discussed below in conjunction with FIG. 17, is executed during step 1620. As previously indicated, the local name space is formed by a series of bind and mount commands. Each bind and mount command is implemented by an entry in the mount table 800. Thus, the read name space subroutine 1700 will access the mount table 800 to generate a name space list, comprised of the "from" and "to" files associated with each bind and mount command, which form the current state of the local name space. It is noted that the preferred implementation of the read name space subroutine 1700 will generate the name space list in terms of pathnames in the name space of the server which provides the particular file, and not necessarily in the local name space.

Figure 18:
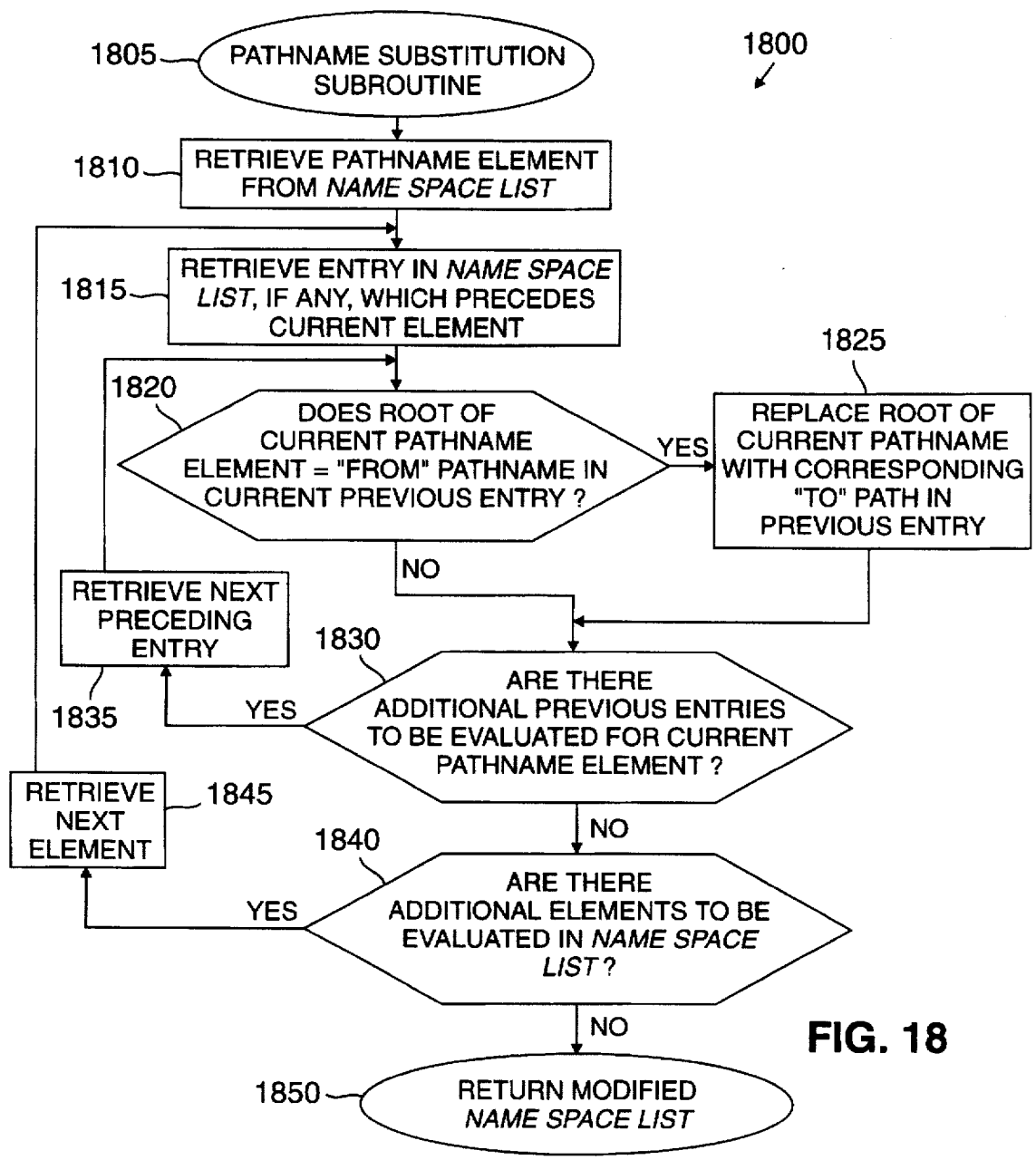
FIG. 18 is a flow chart describing a pathname substitution subroutine which may be utilized by the process execution exporter of FIG. 16A to analyze the list of bind and mount commands generated by the read name space subroutine of FIG. 17 and to replace the pathnames in the name space of the server that provides the file with the complete pathnames in the overall name space of the exporting user or process.

Thus, a pin FIG. substitution subroutine 1800, illustrated in FIG. 18, is preferably executed during step 1625 to analyze the name space list returned from the read name space subroutine 1700 and to replace the "from" and "to" pathnames in the name space of the server which provides the particular file, with the complete pathnames in the overall local name space of the process.

It is noted that although the "from" and "to" pathnames in the name space list are fully specified in the local name space of the user or process, following execution of the pathname substitution subroutine 1800, the entries in the name space list need to be further analyzed to determine whether each entry is associated with a bind or a mount command. It is further noted that when an entry is the result of a mount command, the file tree of a non-kernel file system has been mounted to a file already in the local name space. Thus, a pipe or a network connection is required to establish the communication link to the non-kernel file system, as discussed above in conjunction with FIG. 7.

Figure 19A:
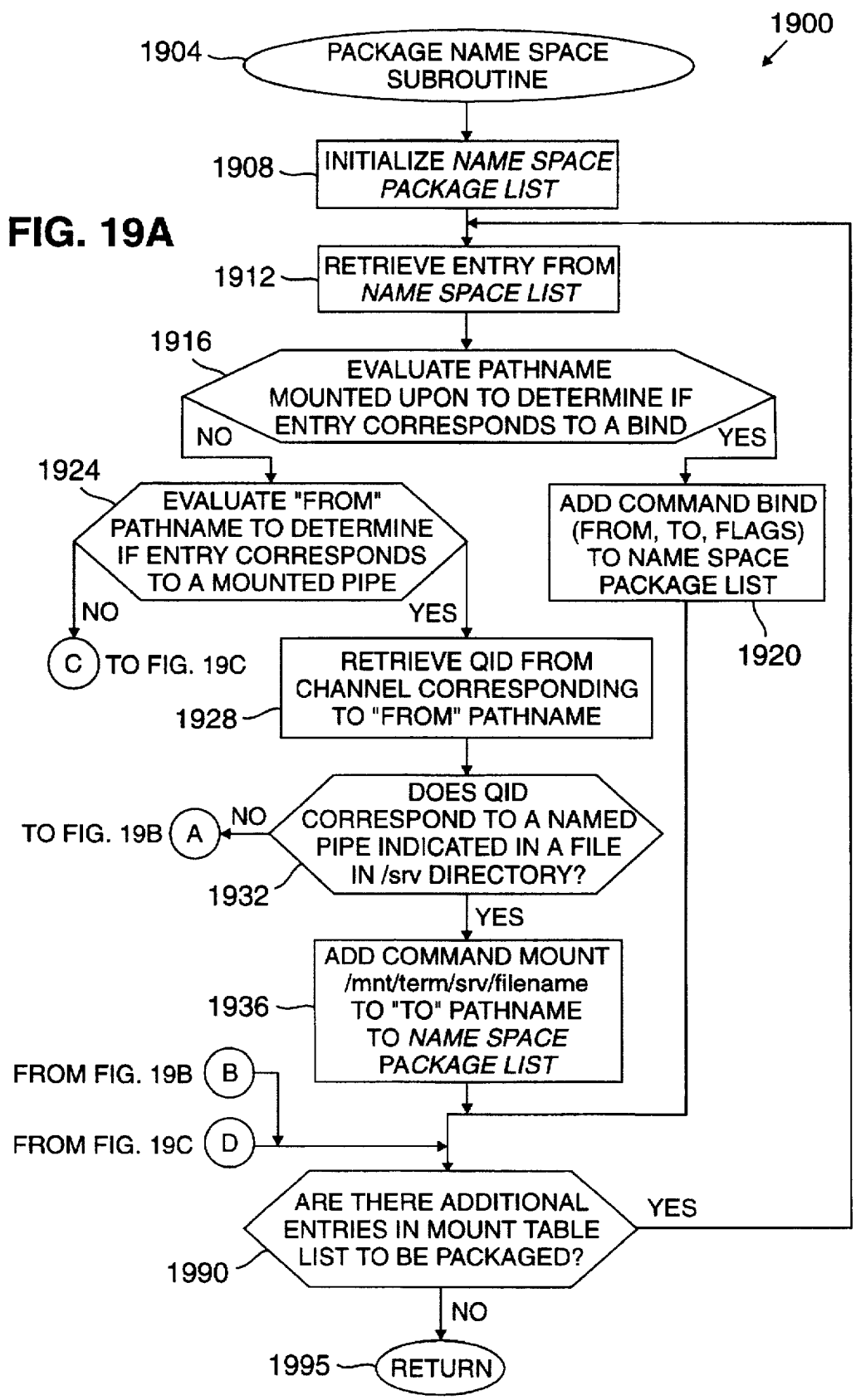

Thus, the process execution exporter 1600 will execute a package name space subroutine 1900, illustrated in FIGS. 19A through 19C, during step 1630 which will analyze the entries in the name space list and package them up as a list of bind and mount commands for transmission to the selected cpu server 120 over the network connection which was established during step 1610. In addition, for each entry in the name space list corresponding to a mount command, the package name space subroutine 1900 will provide information to the cpu server 120 on how to access or establish the appropriate communication link to the mounted non-kernel file system.

Thereafter, the name space package list generated by the package name space subroutine 1900 is transmitted to the selected cpu server 120 during step 1635. After the terminal has exported the representation of the local name space to the cpu server 120, the process execution exporter 1600 becomes a file server during step 1640 to answer remote procedure call requests from the cpu server 120, that are received over the network connection. Essentially, when the process execution exporter 1600 is acting as a file server for the selected cpu server 120, the process execution exporter 1600 is a non-kernel file system, such as the non-kernel file system 750 shown in FIG. 7, which has been mounted into the name space of the cpu server 120.

As previously indicated, when a user desires to export a processing task, such as a computation-intensive application, to a remote processor, such as the cpu server 120, the process execution exporter 1600 executing on the user terminal 105 will dial the selected remote processor, such as the cpu server 120, during step 1610. Preferably, the cpu server 120 includes a process execution importer 1650, shown in FIG. 16B, which contains a daemon process to continuously monitor communications received over the network to listen for incoming connection requests, in a known manner, as illustrated by step 1660 of FIG. 16B. Upon receipt of the connection request from the process execution exporter 1600 executing on the terminal 105, the cpu server 120 will preferably create a new process group for the terminal during step 1662 to process commands on the terminal 105. It is noted that a process group is comprised of the one or more processes which share the same name space.

Thereafter, the cpu server 120 will wait during step 1665 for the name space package list transmitted by the terminal during step 1635. Upon receipt of the name space package list, the process execution importer 1650 will create a channel, identified by a file descriptor, fd, representing the root directory of the terminal during step 1670. The process execution importer 1650 will then create a new name space during step 1675 and abandon the old name space.

The channel representing the root directory of the terminal 105, created during step 1670, is preferably mounted in the new name space of the cpu server 120 in the position, /mnt/term, which represents a portion of the name space allocated to terminals. As discussed above in conjunction with FIGS. 4C and 7, the mounting of a channel which represents the root directory of a remote file system preferably causes the mount device 470 of the cpu server 120 to establish a mount point 450 to represent the communication link to the user terminal. Thus, the channel data structure 705, shown in FIG. 7, represents the root directory of the terminal 105, while the non-kernel file system 750 is the user terminal 105.

Thereafter, during step 1685, the process execution importer 1650 will execute the list of bind and mount commands in the name space package list received from the terminal during step 1665. The cpu server 120 will utilize the received name space to assemble a name space substantially identical to the name space of the terminal 105. In this manner, the cpu server 120 will see the same customized view of the distributed system 100 which has been assembled by the terminal.

In other words, the process execution importer 1650 will bind the resources that were in the name space of the terminal 105 into the same places in the new cpu name space, created during step 1675. For example, the file /mnt/term/dev/mouse, representing the mouse device on the user terminal 105, will be bound onto the file /dev/mouse. Thus, subsequent attempts by the cpu to access the file /dev/mouse will be translated by the mount driver 470 in the cpu server 120 into remote procedure call messages sent to the terminal 105. Thus, local resources on the terminal 105, such as the mouse and the display monitor, become visible to the processes executing on the cpu server 120 at the same place in the name space as on the terminal 105.

Once the name space package received from the terminal has been processed by the cpu server, the process will start a shell process and begin a command interpreter during step 1690. Execution of the process execution importer 1650 will terminate during step 1695, upon the closing of last channel following execution of an end of file command by a user.

As previously indicated, the process execution exporter 1600 will execute a read name space subroutine 1700 during step 1620. The read name space subroutine 1700 will access the mount table 800 to generate a name space list, comprised of the "from" and "to" files associated with each bind and mount command that has been executed to form the current state of the local name space.

As shown in FIG. 17, the read name space subroutine 1700 will be entered at step 1705. The read name space subroutine 1700 will initialize a variable, name space list, during step 1710 which will be utilized to store the list of pathnames associated with each bind and mount command, in order, which represent the current state of the name space.

Thereafter, the read name space subroutine 1700 will search each of the mount "to" data structures 850 in the mount table 800 during step 1720 for the data structure 850 having the lowest mountid value indicated in element 860. As previously indicated, the mountid value is incremented upon each new entry added to the mount table 800, and serves as a time stamp which allows the mount table entries to be retrieved in the order in which they were created.

The entry in the mount table 800 corresponding to the current mountid value is then accessed during step 1730. An entry is preferably created during step 1740 in the name space list for the current entry in the mount table 800 with a pointer to the channel mounted upon, retrieved from the corresponding mount "from" data structure, as well as the pointer to the mounted channel and the mount order flag, retrieved from the mount "to" data structure.

Figure 20:
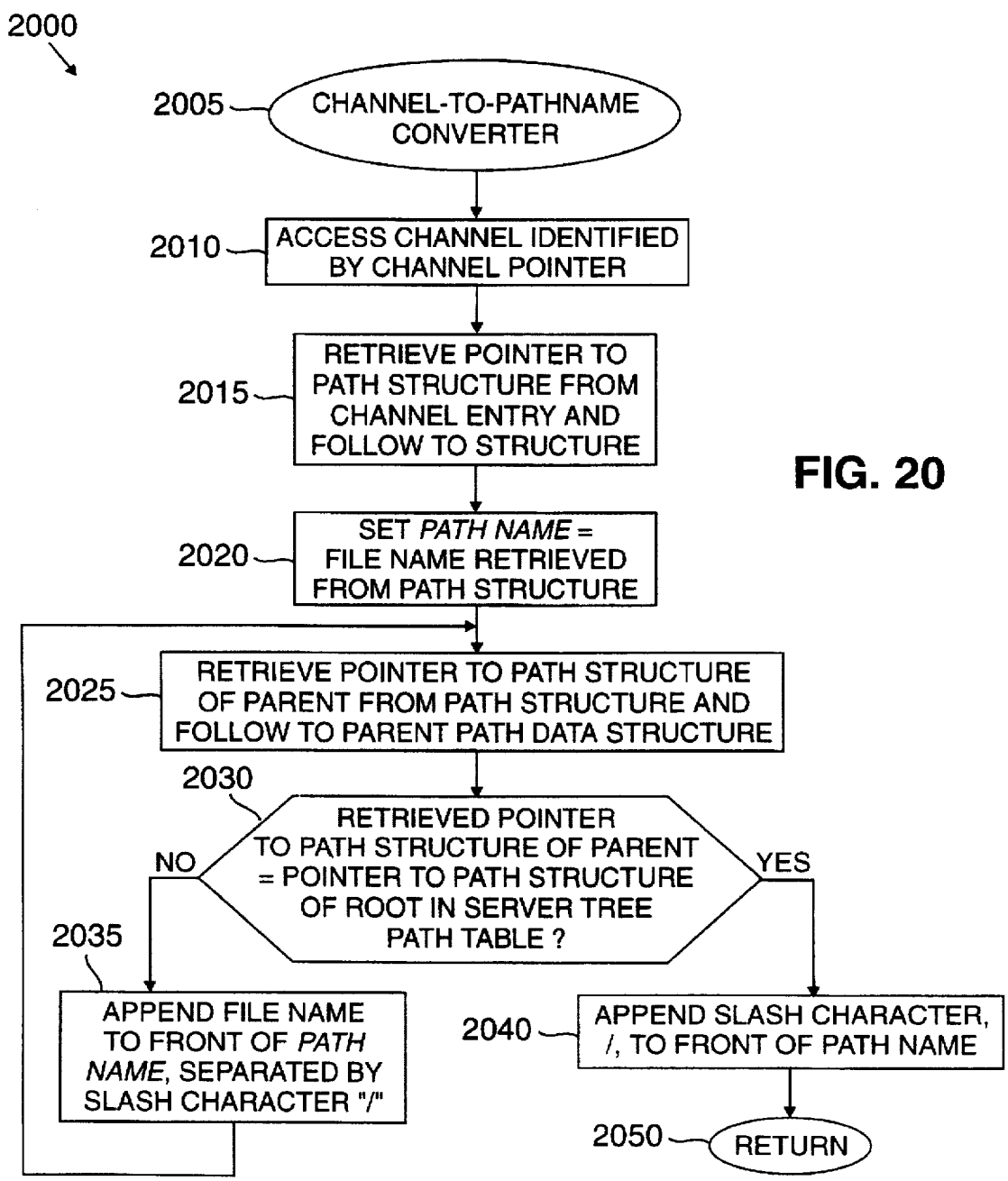
FIG. 20 is a flow chart describing a channel-to-pathname convertor which may be utilized by the read name space subroutine of FIG. 17 to replace a channel representing a file with the corresponding pathname of the file.

Thereafter, a channel-to-pathname convertor 2000, discussed below in conjunction with FIG. 20, is separately executed during step 1760 for the channel mounted upon and the mounted channel to replace each channel in the created entry in the name space list with the pathnames corresponding to the channels in the name space of the server that provides those files.

A test is performed during step 1770 to determine if there are additional entries in the mount table 800 to be evaluated.

If it is determined during step 1770 that there are additional entries in the mount table 800 to be evaluated, then a search is performed during step 1780 for the next lowest mountid value. Thereafter, program control will return to step 1730 and continue in the manner described above.

If, however, it is determined during step 1770 that there are no additional entries in the mount table 800 to be evaluated, then program control will return during step 1790 to the calling process execution exporter 1600.

As previously indicated, the process execution exporter 1600 will execute a pathname substitution subroutine 1800 during step 1625 to analyze the name space list created by the read name space subroutine 1700 and to replace the "from" and "to" pathnames in the name space of the respective server with full pathnames in the overall local name space of the user or process. It is noted that each entry in the name space list is comprised of a pair of "from" and "to" pathname elements corresponding to the associated bind or mount command.

As shown in FIG. 18, the pathname substitution subroutine 1800 will be entered at step 1805. Thereafter, a pathname element is retrieved from the name space list during step 1810. The entry in the name space list, if any, which precedes the current pathname element is then retrieved during step 1815.

A test is performed during step 1820 to determine if the root of the current pathname element, which typically specifies the mount point where the name space of a non-kernel file system is mounted, equals the "from" pathname element in the current previous entry. If it is determined during step 1820 that the root of the current pathname element does equal the "from" pathname element in the current previous entry, then the root of the current pathname element is replaced during step 1825 with the corresponding "to" path from the current previous entry.

If, however, it is determined during step 1820 that the root of the current pathname element does not equal the "from" pathname element in the current previous entry, then a test is performed during step 1830 to determine if there are additional previous entries in the name space list to be evaluated for the current pathname element. If it is determined during step 1830 that there are additional previous entries to be evaluated for the current pathname element, then the next previous entry will be retrieved from the name space list during step 1835. Thereafter, program control will return to step 1820 to process the next preceding entry in the manner described above.

If, however, it is determined during step 1830 that there are no additional previous entries in the name space list to be evaluated for the current pathname element, then a test is performed during step 1840 to determine if there are additional pathname elements to be evaluated in the name space list. If it is determined during step 1840 that there are additional elements to be evaluated in the name space list, then the next element is retrieved from the name space list during step 1845. Thereafter, program control will return to step 1815 to process the next pathname element in the manner described above.

If, however, it is determined during step 1840 that there are no additional elements to be evaluated in the name space list, then program control will return the modified name space list to the calling process execution exporter 1600 during step 1850.

As previously indicated, the process execution exporter 1600 will execute a package name space subroutine 1900 during step 1630 to take the name space list and package it up as a list of binds and mounts for transmission to the remote cpu server. As shown in FIG. 19A, the package name space subroutine 1900 will be entered at step 1904. The package name space subroutine 1900 will initialize a variable, name space package list, during step 1908 which will store the list of bind and mount commands that are to be transmitted to the cpu server 120.

An entry in the name space list is preferably retrieved during step 1912. The "from" pathname element, corresponding to the file which has been mounted upon, is evaluated during step 1916 to determine if the current entry in the name space list is associated with a bind or a mount command. It is noted that a bind may be identified by verifying that the "from" pathname is not a mounted pipe or network connection. It is noted that the "from" pathname associated with a mounted pipe or network connection will include a device that provides pipes or network connections. If it is determined during step 1916 that the current entry in the name space list does correspond to a bind, then a bind command is added to the name space package list, during step 1920 with the "from" and "to" pathnames that were retrieved from the current entry of the name space list during step 1912. Thereafter, program control will proceed to step 1990, discussed below.

If, however, it is determined during step 1916 that the current entry in the name space list does not correspond to a bind, then the entry must correspond to a mount command, and the "from" pathname represents a pipe or a network connection to a non-kernel file system. Thus, a test is performed during step 1924 to determine if the "from" pathname indicates that the current entry corresponds to a mounted pipe. It is noted that if the "from" pathname does indicate a mounted pipe, the pathname will typically include the kernel device that provides pipes. It is further noted that a pipe can be a named pipe, indicated in the /srv directory, as discussed above, or an unnamed pipe.

Thus, if it is determined during step 1924 that the "from" pathname indicates that the current entry corresponds to a mounted pipe, then the qid and type values are retrieved from the channel corresponding to the "from" pathname which has been mounted upon during step 1928. Thereafter, a test is performed during step 1932 to determine if a file in the /srv directory points to a channel having the same qid and type values. If it is determined during step 1932 that a file in the /srv directory does point to a channel having the same qid and type values, then the pipe is a named pipe, and a mount command is added to the name space package list during step 1936 indicating the file /mnt/term/srv/filename should be mounted to the file indicated by the "TO" pathname, where filename indicates the file in the /srv directory identified during step 1932. In this manner, when the cpu server 120 performs the indicated mount command, the same pipe on the user terminal 105 will be utilized to access the non-kernel file system mounted through that pipe.

If, however, it is determined during step 1932 that a file in the /srv directory does not point to a channel having the same qid and type values, then the pipe is not a named pipe. Accordingly, a file is preferably created in the /srv directory, under a particular filename, during step 1940 (FIG. 19B) to store the pointer to the channel which represents the pipe, thereby effectively making the pipe a named pipe. It is noted that in the preferred Plan 9 operating system, by executing an open command for the file #Mn, where #M indicates the mount device 470 (FIG. 4C) and n is equal to the current mountid value, the result will be the channel itself which represents the pipe, which may be posted in the created file in the /srv directory.

Thereafter, a mount command is preferably added to the name space package list during step 1948 indicating that the file /mnt/term/srv/filename should be mounted to the file indicated by the "TO" pathname, where filename indicates the file created during step 1940. In this manner, when the cpu server 120 performs the indicated mount command, the same pipe on the user terminal 105 will be utilized to access the non-kernel file system mounted through that pipe.

It is noted, however, that attempts to create the file during step 1940 may not always be permitted by the kernel 400, for example, where the access permissions have changed. Thus, a test is preferably performed during step 1952 to determine if the attempt to create the file during step 1940 led to a kernel error, thereby indicating that the file was not successfully created. If it is determined during step 1952 that the attempt to create the file during step 1940 did not lead to a kernel error, then the file was successfully created, and program control will proceed to step 1990 (FIG. 19A), discussed below.

If, however, it is determined during step 1952 that the attempt to create the file during step 1940 did lead to a kernel error, then the file was not successfully created. Accordingly, /mnt/term is preferably appended to the "from" pathname in the current entry of the name space list during step 1956. Thereafter, a bind command is preferably added to the name space package list during step 1960 indicating that the appended "from" pathname should be bound to the file indicated by the "TO" pathname. In addition, as discussed above in conjunction with FIG. 16B, the process execution importer 1650 will mount the channel representing the root directory of the terminal to /mnt/term in the name space of the cpu server 120 during step 1680. Thus, when the cpu server 120 attempts to access the file indicated by the unappended "from" pathname, it will be translated into an access of the file represented by the appended "from" pathname, and thus go through the mount point associated with /mnt/term, to the user terminal 105. Thereafter, program control will proceed to step 1990 (FIG. 19A), discussed below.

As previously indicated, a test is performed during step 1924 (FIG. 19A) to determine if the "from" pathname indicates that the current entry corresponds to a mounted pipe. If it is determined during step 1924 that the "from" pathname does not correspond to a mounted pipe, but rather, corresponds to a network connection, then program control will proceed to step 1964 (FIG. 19C). It is noted that if the "from" pathname represents a network connection, it will be in the form of /net/il/2/data, as discussed above in conjunction with FIG. 9B. It is further noted that the remote file in the same directory stores the network destination address corresponding to the network connection. Thus, the "from" pathname is translated during step 1964 from the data file to the remote file. It is noted that given the data file pathname, the change to the remote file is merely lexical. In other words, starting with the network pathname, such as /net/il/2/data, beginning at the final slash character, /, replace the word "data" with "remote".

Thereafter, the contents of the remote file are retrieved during step 1968. The network destination address retrieved from the remote file is then converted during step 1972 to the corresponding machine name and service using the network data base 900, discussed above in conjunction with FIG. 9A. Thereafter, a mount command is added to the name space package list during step 1976 instructing the cpu server 120 to mount the indicated machine! service to the file specified by the "to" pathname. Thereafter, program control will proceed to step 1990 (FIG. 19A), discussed below.

Once the current entry from the name space list is packaged into the name space package list, in the manner just described, a test is performed during step 1990 to determine if there are additional entries in the name space list to be packaged. If it is determined during step 1990 that there are additional entries in the name space list to be packaged, program control will return to step 1912 to process the remaining entries in the manner described above.

If, however, it is determined during step 1990 that there are no additional entries in the name space list to be processed, then program control will return to the calling process execution exporter 1600 during step 1995.

As previously indicated, a path data structure 1140, discussed above in conjunction with FIG. 11, associated with each channel, provides path information that allows the pathname of the given channel to be generated.

As indicated above, the read name space subroutine 1700 will execute a channel-to-pathname convertor 2000 during step 1760 to replace a given channel with the pathname corresponding to the channel in the name space of the server that provides the corresponding file. As shown in FIG. 20, the channel-to-pathname convertor 2000 will be entered at step 2005, with a pointer to the channel to be analyzed.

Thereafter, the channel-to-pathname convertor 2000 will access the channel identified by the received pointer during step 2010. The pointer 640 to the path structure 1140 is then retrieved from the channel data structure, such as the channel 600, during step 2015, and the pointer 640 is followed to the associated path structure 1140.

A variable, pathname, is initially set to the file name retrieved from element 1142 of the path data structure 1140 during step 2020. Thereafter, the pointer 1144 to the path data structure corresponding to the parent file is retrieved during step 2025 and followed to the indicated path data structure 1140. A test is performed during step 2030 to determine if the pointer to the path structure of the parent retrieved during step 2025 equals the pointer to the path data structure associated with the root directory indicated in element 1102 of the server tree path table 1100, in other words, whether the root directory has been reached.

If it is determined during step 2030 that the pointer to the path structure of the parent retrieved during step 2025 does not equal the pointer to the path data structure associated with the root directory, then there are additional elements in the current pathname to be obtained. Thus, the file name indicated in the path structure accessed during step 2025 is appended to the front of the variable, pathname, during step 2035, separated by the slash character. Thereafter, program control will return to step 2025 to process remaining elements in the path name in the manner described above.

If it is determined during step 2030 that the pointer to the path structure of the parent retrieved during step 2025 does equal the pointer to the path data structure associated with the root directory, then the path has been followed all the way back up to the root directory of the respective file server and the slash character, /, is appended to the front of the variable, path name, during step 2035. Since all of the elements have been processed, program control will return to the calling read name space subroutine 1700 during step 2050.

It is to be understood that the embodiments and variations shown and described herein are illustrative of the principles of this invention only and that various modifications may be implemented by those skilled in the art without departing from the scope and spirit of the invention.

I claim:

1. A method performed by a first processor in a distributed computing system for invoking execution of a processing task on a remote processor, said processing task operating on a first name space associated with said first processor, said first name space being formed by a plurality of name space modification commands, said method comprising the steps of:

establishing a communication link between said first processor and said remote processor;

identifying the plurality of name space modification commands that form said first name space, said plurality of identified name space modification commands including at least one dynamic name space modification command; and transmitting said plurality of name space modification commands to said remote processor for execution of said processing task by said remote processor on a name space modified in accordance with said transmitted plurality of name space modification commands.

2. The method according to claim 1 wherein a transmitted name space modification command includes an identification of the communication link to be utilized by said remote processor to access a mounted resource if said name space modification command includes the mounting of a file system of a resource in an indicated portion of said first name space.

3. The method according to claim 2, wherein said identified communication link is an interprocess communication pipe utilized by said first processor to communicate with said resource, if said mounted file system is provided by a resource on the same network node as said first processor.

4. The method according to claim 2, wherein said identified communication link indicates that said remote processor should establish a network connection to said resource, if said mounted file system is provided by a resource on a different network node than said first processor.

5. The method according to claim 1, wherein each of said name space modification commands are stored in an entry of a mount table, each of said entries in said mount table including a value that indicates the order in which said entry was created, and wherein said step of identifying the plurality of name space modification commands that form said first name space retrieves said name space modification commands from said mount table entries in the order in which they were executed.

6. The method according to claim 1, further including the step of cooperating with said remote processor to process file operation requests received by said first processor from said remote processor for files resident on the same network node as said first processor.

7. A method performed by a remote processor in a distributed computing system for executing a processing task received from a first processor, said processing task operating on a first name space associated with said first processor, said first name space being formed by a plurality of name space modification commands, said remote processor having a second name space, said method comprising the steps of:

processing a connection request from said first processor;

allocating a process on said remote processor to execute said invoked processing task;

receiving from said first processor the plurality of name space modification commands that form said first name space, said plurality of received name space modification commands including at least one dynamic name space modification command;

establishing a communication link to said first processor;

mounting said communication link to said first processor in a predefined place in said second name space;

executing said plurality of received name space modification commands to modify said second name space; and executing said invoked processing task on said modified second name space.

8. The method according to claim 7, wherein a received name space modification command includes an identification of the communication link to be utilized by said remote processor to access a particular mounted resource if the name space modification command includes the mounting of a file system in an indicated portion of said name space.

9. The method according to claim 8, wherein said identified communication link is an interprocess communication pipe utilized by said first processor to communicate with said resource, if said mounted file system is provided by a resource on the same network node as said first processor.

10. The method according to claim 8, wherein said identified communication link indicates that said remote processor should establish a network connection to said mounted resource, if said mounted file system is provided by a resource on a different network node than said first processor.

11. The method according to claim 7, further including the step transmitting file operation requests to said first processor for files resident on the same network node as said first processor.

12. An apparatus for storing name space information in a node of a distributed computing system comprised of a plurality of resources, each of said resources being represented as a hierarchical file system, said name space comprised of at least one of said resource hierarchical file systems joined to said name space by one or more name space modification commands, said name space being modifiable on a per process basis, said apparatus comprising:

a mount table for storing an indication of each of said resource hierarchical file systems joined to an indicated portion of said name space by said name space modification commands; and a server tree path table associated with each of said hierarchical file systems joined to said name space, said server tree path table providing path information for each of said files in said associated hierarchical file system, said path information allowing said file system hierarchy to be recreated, said path information for each of said files including the name of said associated file and an indication of the parent file in said hierarchy of said associated file.

13. The apparatus according to claim 12, wherein said mount table includes an entry for each of said name space modification commands, each entry in said mount table including a value that indicates the order in which said entry was created.

14. The apparatus according to claim 12, wherein said mount table includes an entry for each of said name space modification commands, each entry in said mount table indicating the interpretation of a first file in said name space should be translated into a second file.

15. The apparatus according to claim 12, wherein each of said server tree path tables includes at least one pointer for accessing a plurality of path data structures, each of said path data structures being associated with a file in said associated hierarchical file system and storing said file name and said parent information.

16. A method for identifying a pathname associated with a given channel in a distributed computing system, said distributed computing system including a plurality of distributed resources, each of said resources being represented as a hierarchical file system comprised of one or more files, a collection of one or more hierarchical file systems forming a name space, each of said hierarchical file systems having a root directory, each of said channels representing a given file in said name space, each of said files having a filename comprised of an alphanumeric label, said pathname identifying said file by specifying a path through said hierarchical file system from said root directory to said file, said method comprising:

associating a path data structure with each of said channels, said path data structure storing the filename of an associated file and a pointer to said path data structure associated with a parent file in said name space hierarchy;

receiving an indication of the channel for which the pathname is to be identified;

identifying the path data structure associated with said indicated channel;

retrieving said filename and said pointer to said path data structure associated with the parent file from said identified path data structure; and following said retrieved pointer to said path data structure associated with the parent file and repeating said previous step until said root directory of said hierarchical file system is reached, each of said filenames retrieved from said path data structures appended to the front of said generated pathname associated data structures being appended to the front of said generated pathname associated with said indicated channel.

* * * * *